United States Patent
Kawai

(10) Patent No.: US 12,393,722 B2
(45) Date of Patent: Aug. 19, 2025

(54) ENCRYPTED TAG GENERATION APPARATUS, SEARCHABLE ENCRYPTION SYSTEM, ENCRYPTED TAG GENERATION METHOD, AND COMPUTER READABLE MEDIUM

(71) Applicant: Mitsubishi Electric Corporation, Tokyo (JP)

(72) Inventor: Yutaka Kawai, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 140 days.

(21) Appl. No.: 18/380,916

(22) Filed: Oct. 17, 2023

(65) Prior Publication Data
US 2024/0045984 A1 Feb. 8, 2024

Related U.S. Application Data

(63) Continuation of application No. PCT/JP2021/022276, filed on Jun. 11, 2021.

(51) Int. Cl.
| | |
|---|---|
| H04L 29/06 | (2006.01) |
| G06F 7/58 | (2006.01) |
| G06F 21/60 | (2013.01) |
| G06F 21/62 | (2013.01) |

(52) U.S. Cl.
CPC .......... *G06F 21/6227* (2013.01); *G06F 7/588* (2013.01); *G06F 21/602* (2013.01)

(58) Field of Classification Search
None
See application file for complete search history.

(56) References Cited

U.S. PATENT DOCUMENTS

| | | | | |
|---|---|---|---|---|
| 9,256,764 | B2* | 2/2016 | Aissi | G06F 16/2228 |
| 9,391,965 | B2* | 7/2016 | Hattori | H04L 9/30 |
| 10,489,604 | B2* | 11/2019 | Yoshino | G06F 21/6227 |
| RE48,146 | E | 8/2020 | Hattori et al. | |
| 2012/0297201 | A1 | 11/2012 | Matsuda et al. | |
| 2014/0298009 | A1 | 10/2014 | Hattori et al. | |

(Continued)

FOREIGN PATENT DOCUMENTS

| | | |
|---|---|---|
| JP | 2009-42307 A | 2/2009 |
| WO | WO 2011/086687 A1 | 7/2011 |

(Continued)

OTHER PUBLICATIONS

International Search Report (PCT/ISA/210) issued in PCT/JP2021/022276, dated Aug. 31, 2021.

(Continued)

*Primary Examiner* — Maung T Lwin
(74) *Attorney, Agent, or Firm* — BIRCH, STEWART, KOLASCH & BIRCH, LLP

(57) ABSTRACT

A logical expression acquisition unit (502) acquires a logical expression that represents a condition under which searchable encryption is permitted, by a logical structure with a plurality of attribute values and a logical operator. An encrypted tag generation unit (504) sets a secret sharing value which reflects the logical structure, to each of the plurality of attribute values, and generates an encrypted tag to be used for the searchable encryption, using a plurality of secret sharing values set to the plurality of attribute values.

6 Claims, 16 Drawing Sheets

(56) References Cited

U.S. PATENT DOCUMENTS

2020/0351081 A1 11/2020 Hirano et al.
2021/0014057 A1 1/2021 Hayasaka et al.

FOREIGN PATENT DOCUMENTS

WO    WO 2013/111284 A1    8/2013
WO    WO 2019/142268 A1    7/2019
WO    WO 2019/220531 A1    11/2019

OTHER PUBLICATIONS

Meng et al., "Ciphertext-policy attribute-based encryption with hidden sensitive policy from keyword search techniques in smart city", EURASIP Journal on Wireless Communications and Networking, Feb. 3, 2021, pp. 1-22.

Popa et al., "Multi-Key Searchable Encryption", IACR Cryptology ePrint Archive: Report 2013/508, 2013, pp. 1-18.

* cited by examiner

ENCRYPTED TAG GENERATION APPARATUS, SEARCHABLE ENCRYPTION SYSTEM, ENCRYPTED TAG GENERATION METHOD, AND COMPUTER READABLE MEDIUM

CROSS REFERENCE TO RELATED APPLICATIONS

This application is a Continuation of PCT International Application No. PCT/JP2021/022276 filed on Jun. 11, 2021, which is hereby expressly incorporated by reference into the present application.

TECHNICAL FIELD

The present disclosure relates to a searchable encryption technique.

The searchable encryption technique is a technique for searching for data (hereinafter referred to as encrypted data) that has been encrypted, using a keyword that has been encrypted while the keyword remains encrypted.

BACKGROUND ART

Nowadays, as cloud services start prevailing, cloud storage usage of which can start inexpensively and effortlessly, is being widely in use. On the other hand, when data that includes confidential information is managed in cloud, in order to avoid a risk of information leakage, it is necessary to encrypt the data and store the encrypted data.

Searchable encryption enables searching for the encrypted data without decryption, thus can achieve both safety and functionality.

The searchable encryption uses two encrypted keywords to realize the search.

The first is an encrypted tag. The encrypted tag is an encrypted keyword that is associated with encrypted data. The second is a trapdoor. The trapdoor is an encrypted keyword that is used for a search condition.

At time of registration, the encrypted data and the encrypted tag are associated with each other and registered in a storage server such as cloud storage. The encrypted tag is associated with the encrypted data itself or an identifier of the encrypted data. The encrypted tag is stored in the storage server as an encrypted index.

In the searchable encryption, a searcher transmits a trapdoor to the storage server.

The storage server finds an encrypted tag that is consistent with the trapdoor without decrypting the trapdoor. Then, the storage server extracts encrypted data associated with the encrypted tag, and transmits the extracted encrypted data to the searcher.

Thereby, in the searchable encryption, it is possible to search for data without exposing the data and a keyword.

The searchable encryption can be broadly classified into common key type searchable encryption and public key type searchable encryption.

The public key type searchable encryption uses different keys for generation of an encrypted tag and a trapdoor, while the common key type searchable encryption uses the same key for generation of an encrypted tag and a trapdoor.

Further, in general, the common key type searchable encryption can perform search at a higher speed than that of the public key type searchable encryption.

As techniques relating to the present disclosure, there are the technique described in Patent Literature 1 and the technique described in Non-Patent Literature 1.

Patent Literature 1 and Non-Patent Literature 1 describe an access control method for the common key type searchable encryption.

CITATION LIST

Patent Literature

Patent Literature 1: WO 2019/142268 A1

Non-Patent Literature

Non-Patent Literature 1: R. A. Popa, N. Zeldovich, "Multi-Key Searchable Encryption", IACR Cryptology ePrint Archive: Report 2013/508

SUMMARY OF INVENTION

Technical Problem

In the techniques described in Patent Literature 1 and Non-Patent Literature 1, an access control pattern is decided before operation of a searchable encryption system starts, and access control is performed according to the decided access control pattern. The access control pattern is a logical expression that represents a condition under which searchable encryption is permitted, by a logical structure with a plurality of attribute values and a logical operator (simply referred to as an operator).

In the techniques described in Patent Literature 1 and Non-Patent Literature 1, the logical structure in the access control pattern is previously decided, such as a logical expression with one logical sum operator, or a logical expression with two logical product operators, for example. Then, in the techniques described in Patent Literature 1 and Non-Patent Literature 1, the access control is performed according to the previously decided logical structure.

In this way, in the techniques described in Patent Literature 1 and Non-Patent Literature 1, once the access control pattern is decided, it is not allowed to perform the access control using an access control pattern different from the decided access control pattern.

Therefore, in the techniques described in Patent Literature 1 and Non-Patent Literature 1, in order to perform the access control using a new access pattern, reconstruction of the searchable encryption system is necessary, thus there is a problem of extremely low convenience.

The present disclosure mainly aims to solve a problem such as above. That is, the present disclosure mainly aims to realize searchable encryption that enables more flexible access control.

Solution to Problem

An encrypted tag generation apparatus according to the present disclosure includes:

a logical expression acquisition unit to acquire a logical expression that represents a condition under which searchable encryption is permitted, by a logical structure with a plurality of attribute values and a logical operator; and an encrypted tag generation unit to set a secret sharing value which reflects the logical structure, to each of the plurality of attribute values, and to generate an encrypted tag to be used for the searchable encryption, using a plurality of secret sharing values set to the plurality of attribute values.

Advantageous Effects of Invention

In the present disclosure, a secret sharing value which represents a logical structure by a logical expression is set to each attribute value, and an encrypted tag is generated using the secret sharing value set to each attribute value. Therefore, according to the present disclosure, it is possible to freely decide the logical structure represented by the logical expression, and to realize more flexible access control in searchable encryption.

DESCRIPTION OF EMBODIMENTS

Figure 1:
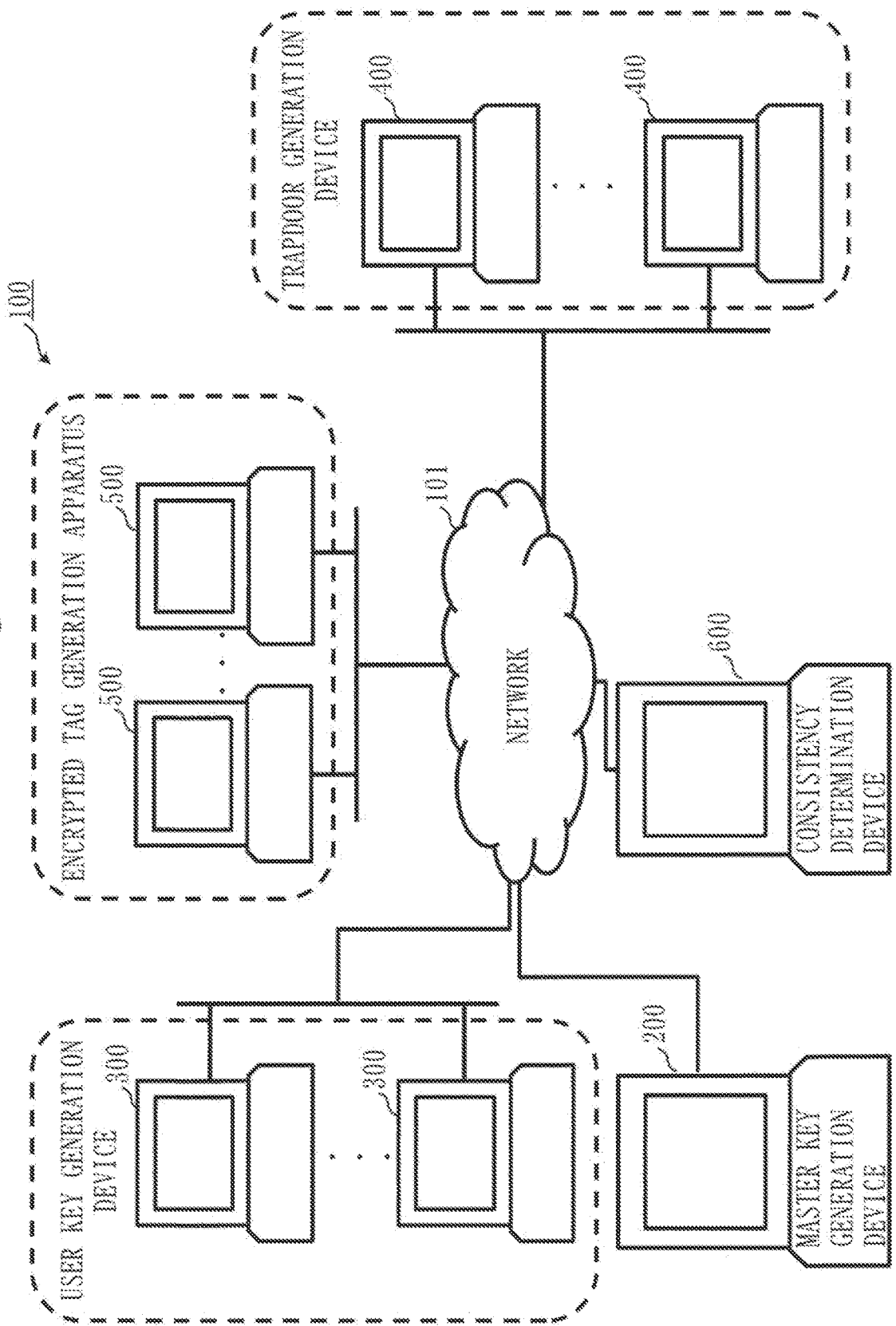
FIG. 1 is a diagram illustrating a configuration example of a searchable encryption system according to Embodiment 1.

Embodiments will be described hereinafter with reference to the drawings. In the following description of the embodiments and the drawings, portions denoted by the same reference signs indicate the same or corresponding portions.

Embodiment 1

Overview

The present embodiment describes a searchable encryption system that realizes flexible access control in common key type searchable encryption.

In the searchable encryption system according to the present embodiment, an encrypted tag is generated using a logical expression that represents a condition (hereinafter referred to as a searchable condition) of a user who is permitted to perform searchable encryption, by a logical structure with a plurality of attribute values (values that represent a job title, a division which the user belongs to, and the like) and a logical operator (a logical sum operator or a logical product operator). Then, in the searchable encryption system according to the present embodiment, there is no need to set a constraint on the length of the logical expression (that is, the number of attribute values included in the logical expression) used for generation of the encrypted tag. Therefore, the flexible access control is possible.

In order to enable the logical expression whose length has no constraint, it is necessary to generate a parameter for each attribute value. Conventionally, since there is only one parameter, it is necessary to decide in advance how may attribute values are included in the one parameter, that is, the length of the logical expression the one parameter should generate. In the searchable encryption system according to the present embodiment, since a parameter is generated for each attribute value, no upper limit is needed on the number of attribute values included in the logical expression. When a parameter is generated for each attribute value in this way, the encrypted tag needs to accurately reflect the logical structure of the logical expression.

For example, a logical expression "A AND B" and a logical expression "A OR B" include the same two attribute values (A and B). In this case, encrypted tags need be generated so that logical structures represented by the two logical expressions are distinguished from each other. That is, the encrypted tags need be generated so that it is distinguishable that a logical operator included in each logical expression is the logical product operator (AND) or the logical sum operator (OR).

In the present embodiment, a secret sharing value which reflects a logical structure of a logical expression is set to each attribute value, and an encrypted tag is generated using the secret sharing value set to each attribute value. That is, when the logical product operator (AND) is included in the logical expression, to each of attribute values (logical product attribute values) which are connected by the logical product operator (AND), a secret sharing value which reflects that each of logical product attribute values is connected by the logical product operator (AND) is set. Further, when the logical sum operator (OR) is included in the logical expression, to each of attribute values (logical sum attribute values) which are connected by the logical sum operator (OR), a secret sharing value which reflects that each of logical sum attribute values is connected by the logical sum operator (OR) is set.

Specifically, in a case of the logical expression "A AND B" described above, a secret sharing value s1 is set to an attribute value A, and a secret sharing value s2 is set to an attribute value B, where s=s1+s2. Further, in a case of the logical expression "A OR B", the secret sharing value s is set to both of the attribute value A and the attribute value B.

Thus, in the searchable encryption system according to the present embodiment, it is possible to freely decide a logical structure represented by a logical expression, and to realize more flexible access control than the conventional.

\*\*\*Description of Functional Configuration\*\*\*

FIG. 1 illustrates a configuration example of a searchable encryption system 100 according to the present embodiment.

As illustrated in FIG. 1, the searchable encryption system 100 includes a master key generation device 200, a plurality of user key generation devices 300, a plurality of trapdoor generation devices 400, a plurality of encrypted tag generation apparatuses 500, and a consistency determination device 600.

The master key generation device 200, the plurality of user key generation devices 300, the plurality of trapdoor generation devices 400, the plurality of encrypted tag generation apparatuses 500, and the consistency determination device 600 are interconnected via a network 101.

The network 101 is, for example, the Internet.

A network other than the Internet may be used as the network 101. For example, a Local Area Network (LAN) may be used as the network 101. When the LAN is used as the network 101, the master key generation device 200, the plurality of user key generation devices 300, the plurality of trapdoor generation devices 400, the plurality of encrypted tag generation apparatuses 500, and the consistency determination device 600 are installed within the same company.

Each of the master key generation device 200, the user key generation device 300, the trapdoor generation device 400, the encrypted tag generation apparatus 500, and the consistency determination device 600 is a computer.

Each of the master key generation device 200, the user key generation device 300, the trapdoor generation device 400, the encrypted tag generation apparatus 500, and the consistency determination device 600 is, for example, a Personal Computer (PC). The consistency determination device 600 is, for example, a storage server.

The master key generation device 200 generates a master key K according to a bit length U.

Figure 2:
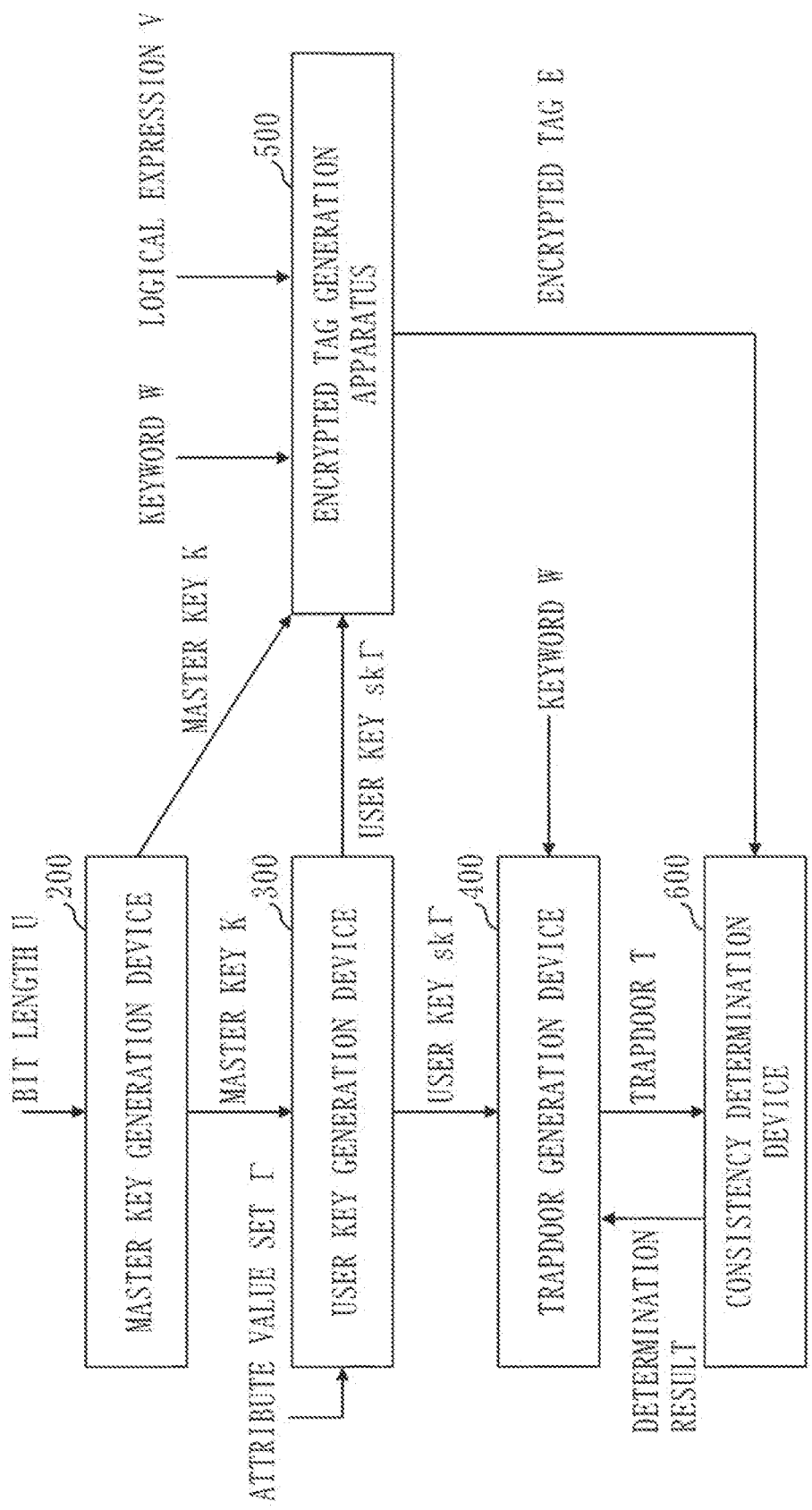
FIG. 2 is a diagram illustrating a data flow according to Embodiment 1.

Then, as illustrated in FIG. 2, the master key generation device 200 transmits the generated master key K to the user key generation device 300 and the encrypted tag generation apparatus 500, via the network 101.

As illustrated in FIG. 2, the user key generation device 300 receives the master key K.

Further, the master key generation device 200 acquires an attribute value set Γ which is a set of attribute values of a user, and generates a user key skΓ, using the master key K and the attribute value set Γ.

Then, the user key generation device 300 transmits the generated user key skΓ to the trapdoor generation device 400 and the encrypted tag generation apparatus 500, via the network 101. The user key skΓ may be sent by means such as mail without going through the network 101.

As illustrated in FIG. 2, the trapdoor generation device 400 receives the user key skΓ.

Further, the trapdoor generation device 400 acquires a keyword W, and generates a trapdoor T, using the user key skΓ and the keyword W. The keyword W is a keyword used for searchable encryption.

Then, the trapdoor generation device 400 transmits the generated trapdoor T to the consistency determination device 600 via the network 101.

As illustrated in FIG. 2, the encrypted tag generation apparatus 500 receives the master key K and the user key skΓ.

Further, the encrypted tag generation apparatus 500 acquires a keyword W and a logical expression V, and generates an encrypted tag E, using the master key K, the user key skΓ, the keyword W, and the logical expression V.

As described above, the logical expression V is a logical expression that represents a searchable condition by a logical structure with a plurality of attribute values and a logical operator. The searchable condition is a condition of an attribute of a user under which searchable encryption is permitted.

The encrypted tag generation apparatus 500 transmits the generated encrypted tag E to the consistency determination device 600, via the network 101.

An operation procedure of the encrypted tag generation apparatus 500 is equivalent to an encrypted tag generation method. Further, a program that implements operation of the encrypted tag generation apparatus 500 is equivalent to an encrypted tag generation program.

As illustrated in FIG. 2, the consistency determination device 600 receives the trapdoor T and the encrypted tag E.

Then, the consistency determination device 600 determines whether or not the keyword W included in the trapdoor T and the keyword W included in the encrypted tag E are consistent with each other.

Then, the consistency determination device 600 transmits a determination result to the trapdoor generation device 400, via the network 101.

Figure 3:
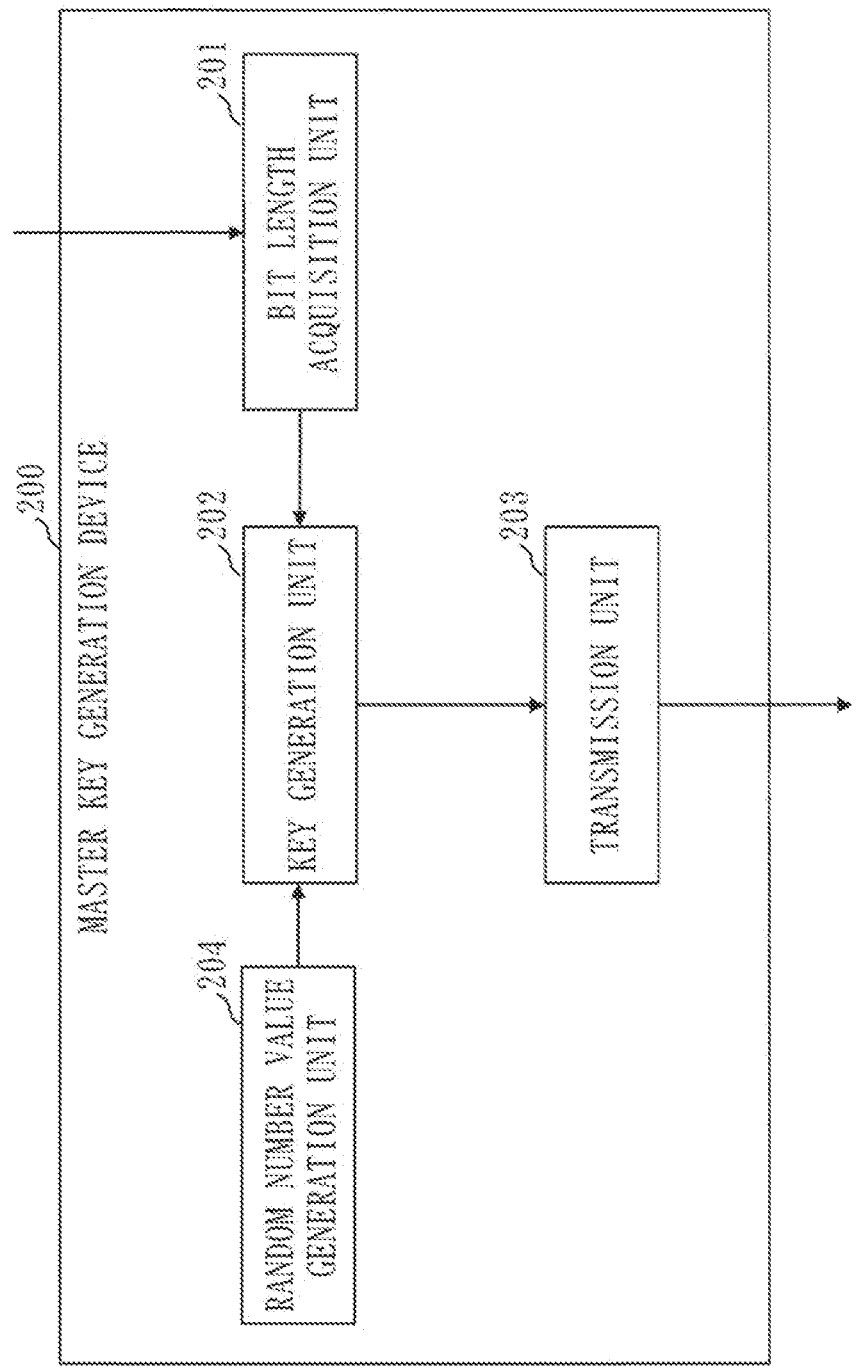
FIG. 3 is a diagram illustrating a functional configuration example of a master key generation device according to Embodiment 1.

FIG. 3 illustrates a functional configuration example of the master key generation device 200 according to the present embodiment.

As illustrated in FIG. 3, the master key generation device 200 includes a bit length acquisition unit 201, a key generation unit 202, a transmission unit 203, and a random number value generation unit 204.

Although it is not illustrated, the master key generation device 200 includes a storage medium for storing data used in each element illustrated in FIG. 3.

The bit length acquisition unit 201 acquires the bit length U of a key used in the searchable encryption system 100.

The key generation unit 202 generates the master key K which is a basis for computation to be performed in the searchable encryption system 100 in such a way that the master key K conforms to the bit length U, according to a common key searchable encryption scheme.

The key generation unit 202 generates the master key K, using a random number value generated by the random number value generation unit 204.

The random number value generation unit 204 generates the random number value used for the generation of the master key K.

The transmission unit 203 transmits the master key K generated by the key generation unit 202, to the user key generation device 300 and the encrypted tag generation apparatus 500.

Figure 4:
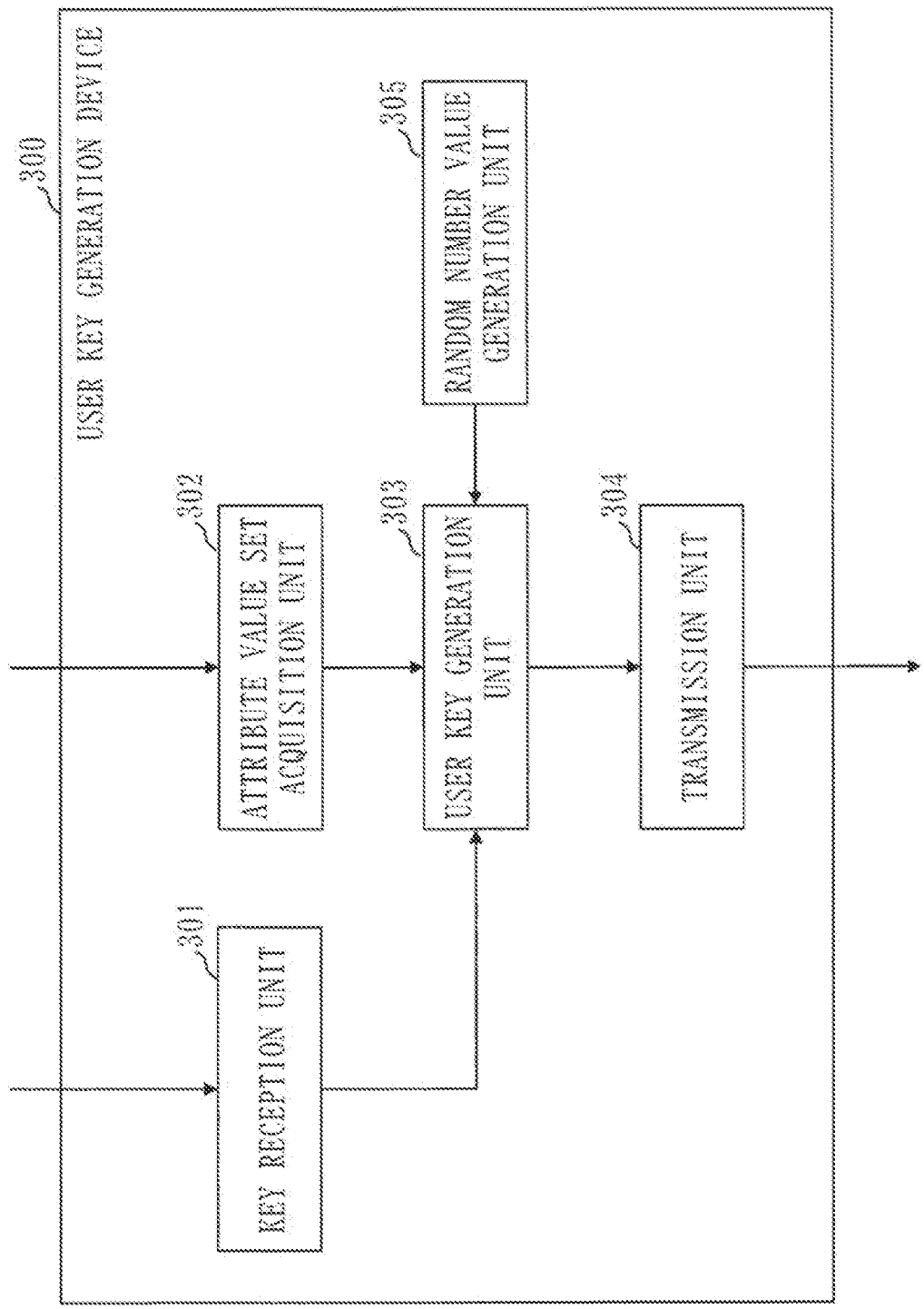
FIG. 4 is a diagram illustrating a functional configuration example of a user key generation device according to Embodiment 1.

FIG. 4 illustrates a functional configuration example of the user key generation device 300 according to the present embodiment.

As illustrated in FIG. 4, the user key generation device 300 includes a key reception unit 301, an attribute value set acquisition unit 302, a user key generation unit 303, a transmission unit 304, and a random number value generation unit 305.

Although it is not illustrated, the user key generation device 300 includes a storage medium for storing data used in each element illustrated in FIG. 4.

The key reception unit 301 receives the master key K from the master key generation device 200.

The attribute value set acquisition unit 302 acquires the attribute value set Γ which is a set of attribute values of a user to be set to a user key.

The user key generation unit 303 generates the user key skΓ, using the master key K, the attribute value set Γ, and a random number value generated by the random number value generation unit 305.

The random number value generation unit 305 generates the random number value used for the generation of the user key skΓ.

The transmission unit 304 transmits the user key skΓ generated by the user key generation unit 303, to the trapdoor generation device 400 and the encrypted tag generation apparatus 500.

Figure 5:
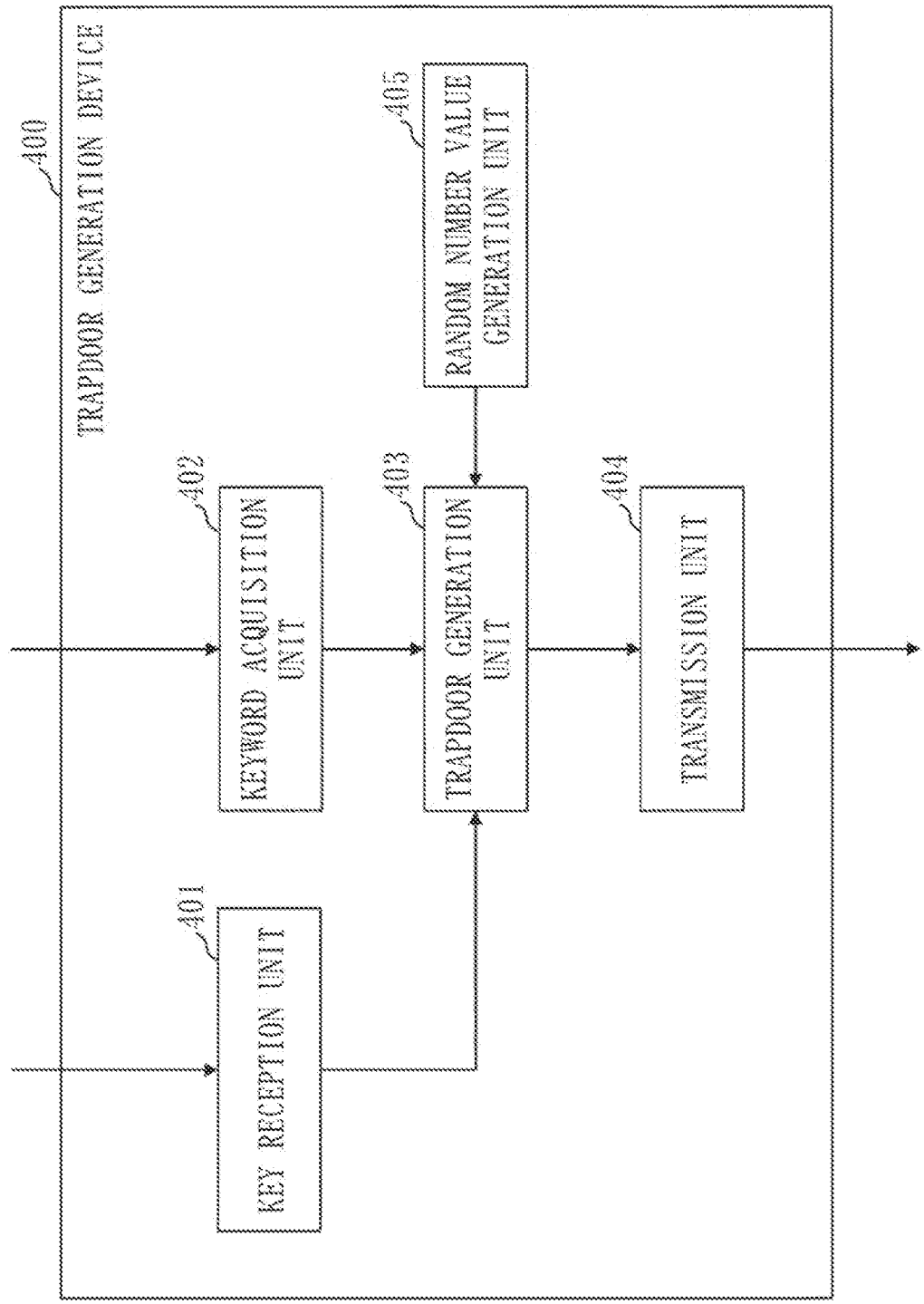
FIG. 5 is a diagram illustrating a functional configuration example of a trapdoor generation device according to Embodiment 1.

FIG. 5 illustrates a functional configuration example of the trapdoor generation device 400 according to the present embodiment.

As illustrated in FIG. 5, the trapdoor generation device 400 includes a key reception unit 401, a keyword acquisition unit 402, a trapdoor generation unit 403, a transmission unit 404, and a random number value generation unit 405.

Although it is not illustrated, the trapdoor generation device 400 includes a storage medium for storing data used in each element illustrated in FIG. 5.

The key reception unit 401 receives the user key skΓ from the user key generation device 300.

The keyword acquisition unit 402 acquires the keyword W.

The trapdoor generation unit 403 generates the trapdoor T, using the user key skΓ, the keyword W, and a random number value generated by the random number value generation unit 405.

The trapdoor generation unit 403 generates the trapdoor T, using a random number value (a common random number value) common to a plurality of trapdoors T.

The random number value generation unit 405 generates the random number value used for the generation of the trapdoor T.

The transmission unit 404 transmits the trapdoor T generated by the trapdoor generation unit 403, to the consistency determination device 600.

Figure 6:
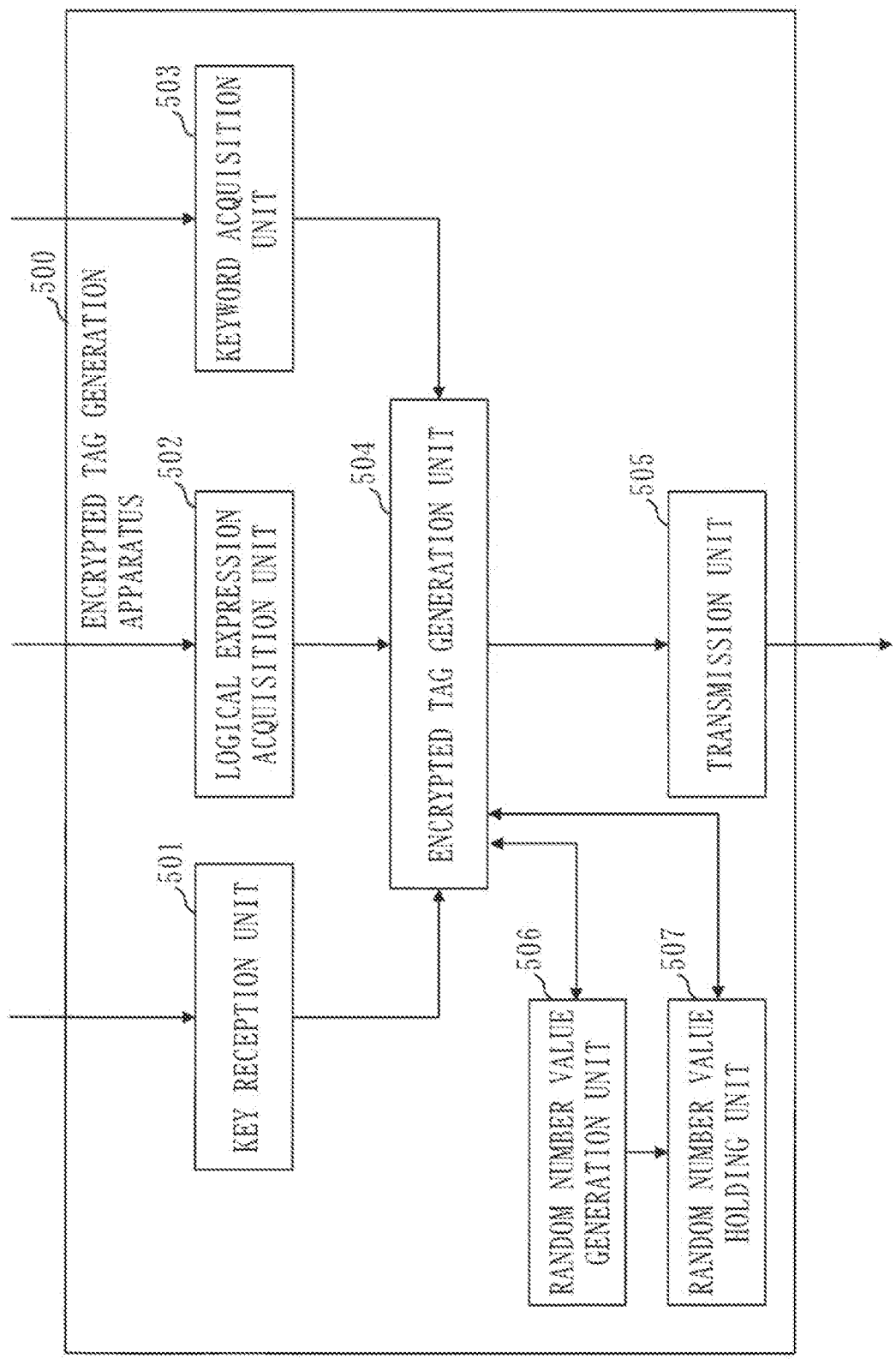
FIG. 6 is a diagram illustrating a functional configuration example of an encrypted tag generation apparatus according to Embodiment 1.

FIG. 6 illustrates a functional configuration example of the encrypted tag generation apparatus 500 according to the present embodiment.

As illustrated in FIG. 6, the encrypted tag generation apparatus 500 includes a key reception unit 501, a logical expression acquisition unit 502, a keyword acquisition unit 503, an encrypted tag generation unit 504, a transmission unit 505, a random number value generation unit 506, and a random number value holding unit 507.

Although it is not illustrated, the encrypted tag generation apparatus 500 includes a storage medium for storing data used in each element illustrated in FIG. 6 except for the random number value generation unit 506 and the random number value holding unit 507. As described below, a random number value generated by the random number value generation unit 506 is held as a holding random number value. The holding random number value is used in a secret sharing value. In order to more clearly show that the random number value is held as the holding random number value, FIG. 6 particularly illustrates the random number value holding unit 507 that holds the random number value.

The key reception unit 501 receives the master key K and the user key skΓ.

The logical expression acquisition unit 502 acquires the logical expression V that represents a searchable condition L.

A process performed by the logical expression acquisition unit 502 is equivalent to a logical expression acquisition process.

The keyword acquisition unit 503 acquires the keyword W.

The encrypted tag generation unit 504 generates the encrypted tag E, using the master key K, the user key skΓ, the logical expression V, the keyword W, the random number value generated by the random number value generation unit 506, and the holding random number value held by the random number value holding unit 507.

A process performed by the encrypted tag generation unit 504 is equivalent to an encrypted tag generation process.

The random number value generation unit 506 generates the random number value used for the generation of the encrypted tag E.

The random number value holding unit 507 holds the random number value generated by the random number value generation unit 506.

When the random number value generation unit 506 generates a new random number value and the encrypted tag generation unit 504 generates a further new random number value, the random number value holding unit 507 updates the holding random number value with the new random number value and/or the further new random number value.

The transmission unit 505 transmits the encrypted tag E generated by the encrypted tag generation unit 504, to the consistency determination device 600.

Figure 7:
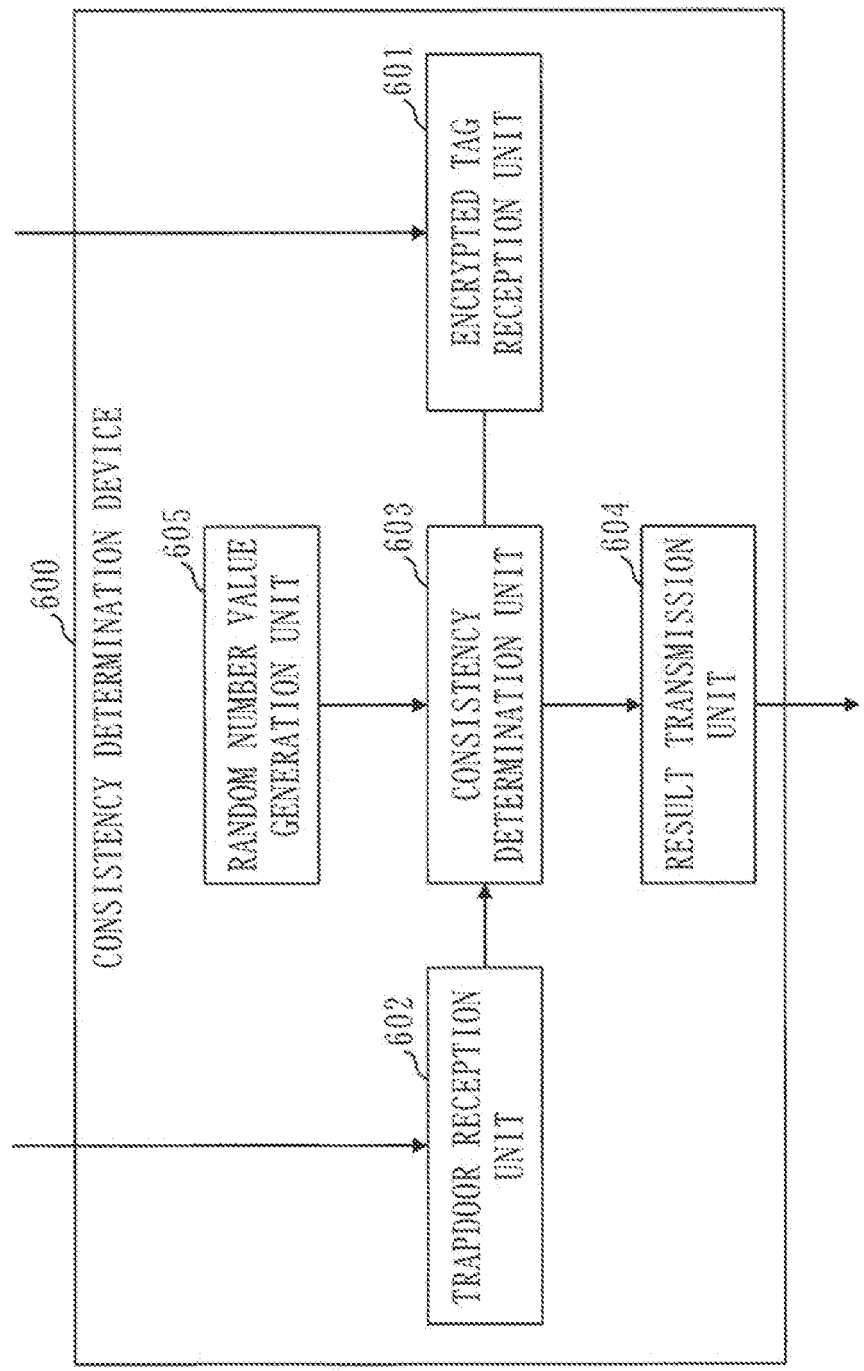
FIG. 7 is a diagram illustrating a functional configuration example of a consistency determination device according to Embodiment 1.

FIG. 7 illustrates a functional configuration example of the consistency determination device 600 according to the present embodiment.

As illustrated in FIG. 7, the consistency determination device 600 includes an encrypted tag reception unit 601, a trapdoor reception unit 602, a consistency determination unit 603, a result transmission unit 604, and a random number value generation unit 605.

Although it is not illustrated, the consistency determination device 600 includes a storage medium for storing data used in each element illustrated in FIG. 7.

The encrypted tag reception unit 601 receives the encrypted tag E.

The trapdoor reception unit 602 receives the trapdoor T.

The consistency determination unit 603 performs consistency determination.

Specifically, the consistency determination unit 603 determines whether or not the keyword W included in the encrypted tag E is consistent with the keyword W included in the trapdoor T, using a random number value generated by the random number value generation unit 605.

The result transmission unit 604 transmits a determination result of the consistency determination unit 603, to the trapdoor generation device 400.

For example, when the consistency determination unit 603 determines that the keyword W included in the encrypted tag E is consistent with the keyword W included in the trapdoor T, the result transmission unit 604 transmits "0" as the determination result. On the other hand, when inconsistency is determined, the result transmission unit 604 transmits "1" as the determination result. The result transmission unit 604 may use other numerical values, characters, or symbols, as the determination result.

When the keyword W included in the encrypted tag E is consistent with the keyword W included in the trapdoor T, the result transmission unit 604 may acquire 20 from, for example, a database not illustrated, encrypted data associated with the encrypted tag E, instead of the transmission of the determination result. Then, the result transmission unit 604 may transmit the acquired encrypted data to the trapdoor generation device 400.

\*\*\*Regarding Cryptography\*\*\*

Next, cryptography that is a premise for operation of the searchable encryption system 100 according to the present embodiment will be described.

Attribute-based encryption is cryptography which enables decryption only by a user who possesses a user key generated from an attribute value set $\Gamma$ which is a set of attribute values that satisfy a searchable condition L. The attribute-based encryption is composed of, for example, algorithms described below.

Setup ABESETUP

A master key K and a public key pk corresponding to an acquired bit length, are generated.

User Key Generation ABEKEYGEN

A user key sk$\Gamma$ corresponding to the attribute value set $\Gamma$ is generated using the master key K and the attribute value set $\Gamma$.

Encryption ABEENC

A key KK for common key encryption is generated using the public key pk and the searchable condition L, and a ciphertext P is generated using the key KK.

Decryption ABEDEC

It is determined using the user key sk$\Gamma$ and the ciphertext P, whether or not the attribute value set $\Gamma$ is consistent with the searchable condition L used when the ciphertext P is generated. When the attribute value set $\Gamma$ is consistent with the searchable condition L, the key KK used for the encryption of the ciphertext P is output.

In common key cryptography, a plaintext M is encrypted using the master key K. Further, in the common key cryptography, a ciphertext C is decrypted using the master key K to obtain the plaintext M.

The master key K is a random value. The common key cryptography is composed of, for example, algorithms described below.

Encryption SKEENC

The plaintext M is encrypted using the master key K, and the ciphertext C is output.

Decryption SKEDEC

The ciphertext C is decrypted using the master key K, and the plaintext M is output.

In the embodiment, counter mode cryptography using a block cipher is used among the common key cryptography. In the following, an encryption process is referred to as SCTRENC and a decryption process is referred to as SCTRDEC, in the counter mode cryptography using the block cipher.

Auxiliary information (counter value) is in a counter mode. In the following, the auxiliary information (counter value) is referred to as auxC.

In the counter mode cryptography using the block cipher, encryption is performed in the following.

$$C=\text{SCTRENC}(K,\text{auxC})+M$$

C is a cyphertext. M is a plaintext. K is a master key. Further, "+" indicates an exclusive OR.

Further, in the counter mode cryptography using the block cipher, decryption is performed in the following.

$$M=\text{SCTRENC}(K,\text{auxC})+C$$

\*\*\*Description of Operation\*\*\*

Next, an operational example of the searchable encryption system 100 according to the present embodiment will be described.

Figure 8:
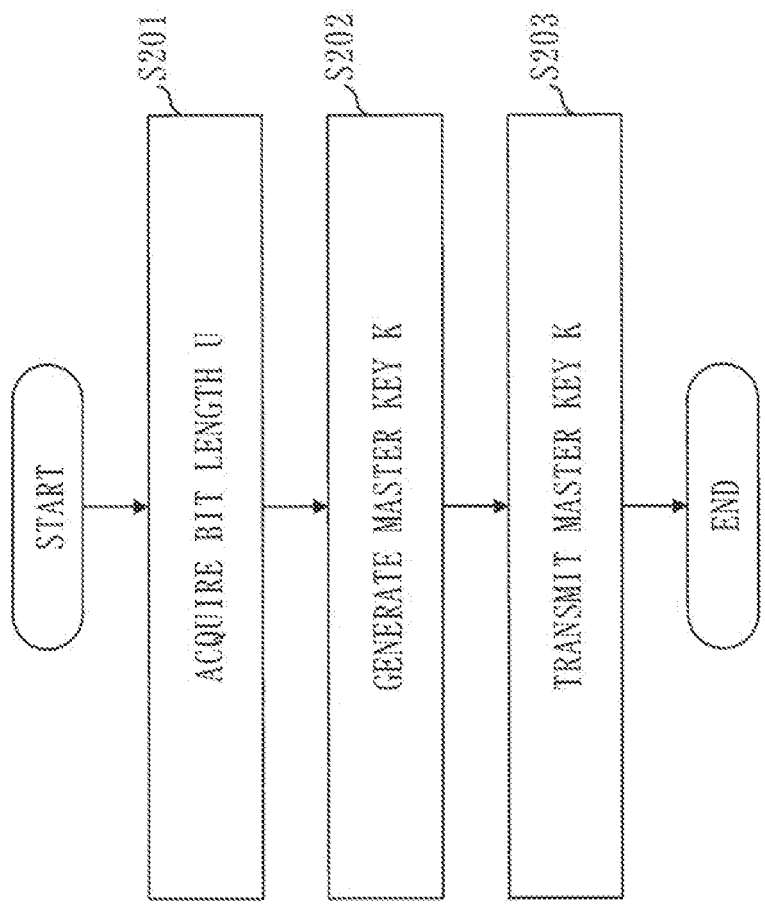
FIG. 8 is a flowchart illustrating a flow of processing of the master key generation device according to Embodiment 1

FIG. 8 illustrates an operational example of the master key generation device 200 according to the present embodiment.

First, in step S201, the bit length acquisition unit 201 acquires the bit length U of the key.

Next, in step S202, the random number value generation unit 204 generates an M-bit random number value, and the key generation unit 202 generates the master key K, using the random number value. The key generation unit 202 may use the M-bit random number value itself as the master key K.

Lastly, in step S203, the transmission unit 203 transmits the master key K to the user key generation device 300 and the encrypted tag generation apparatus 500.

Figure 9:
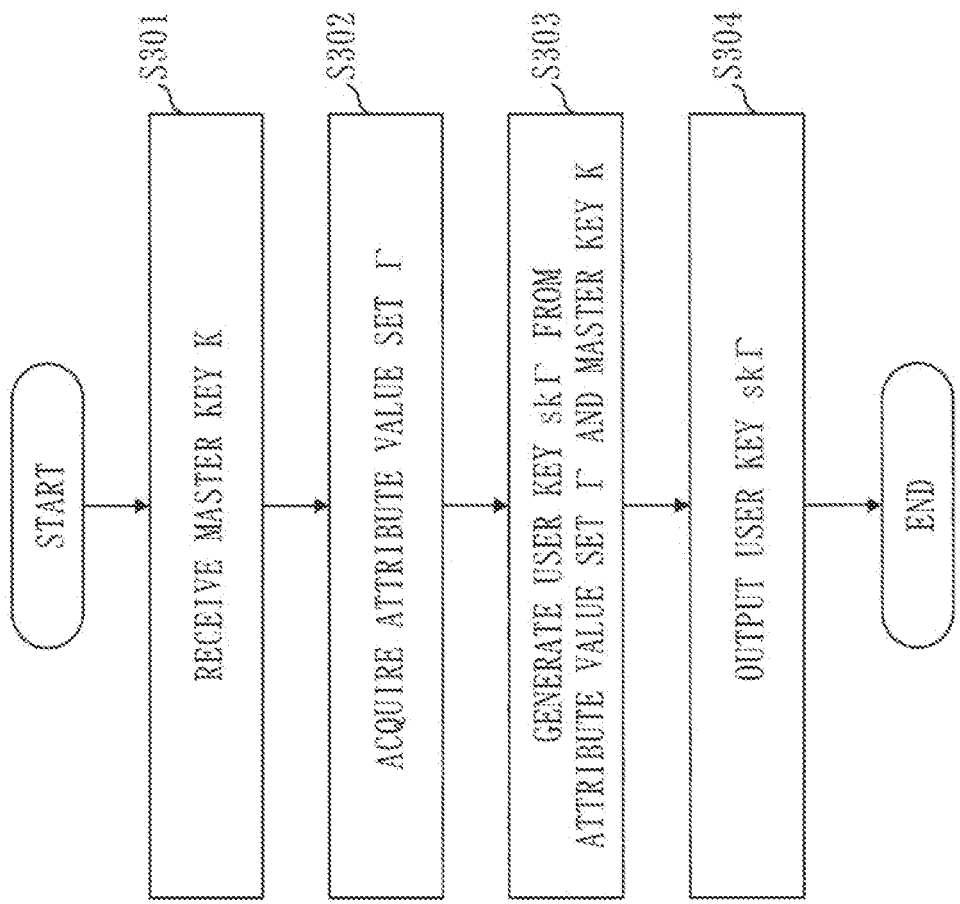
FIG. 9 is a flowchart illustrating a flow of processing of the user key generation device according to Embodiment 1.

FIG. 9 illustrates an operational example of the user key generation device 300 according to the present embodiment.

First, in step S301, the key reception unit 301 receives the master key K.

Next, in step S302, the attribute value set acquisition unit 302 acquires the attribute value set $\Gamma$.

Next, in step S303, the user key generation unit 303 generates the user key sk$\Gamma$.

Specially, the user key generation unit 303 generates the user key sk$\Gamma$ in the following.

Note that $\Gamma=\{Qi\}(i=1,\ldots,n)$. Qi is an attribute included in the attribute value set $\Gamma$. Further, H means a hash operation in the following.

$$ski=H(K,Qi)(i=1,\ldots,n)$$

$$sk\Gamma=(sk1,\ldots,skn)$$

Lastly, in step S304, the transmission unit 304 transmits the user key sk$\Gamma$ to the trapdoor generation device 400 and the encrypted tag generation apparatus 500.

Figure 10:
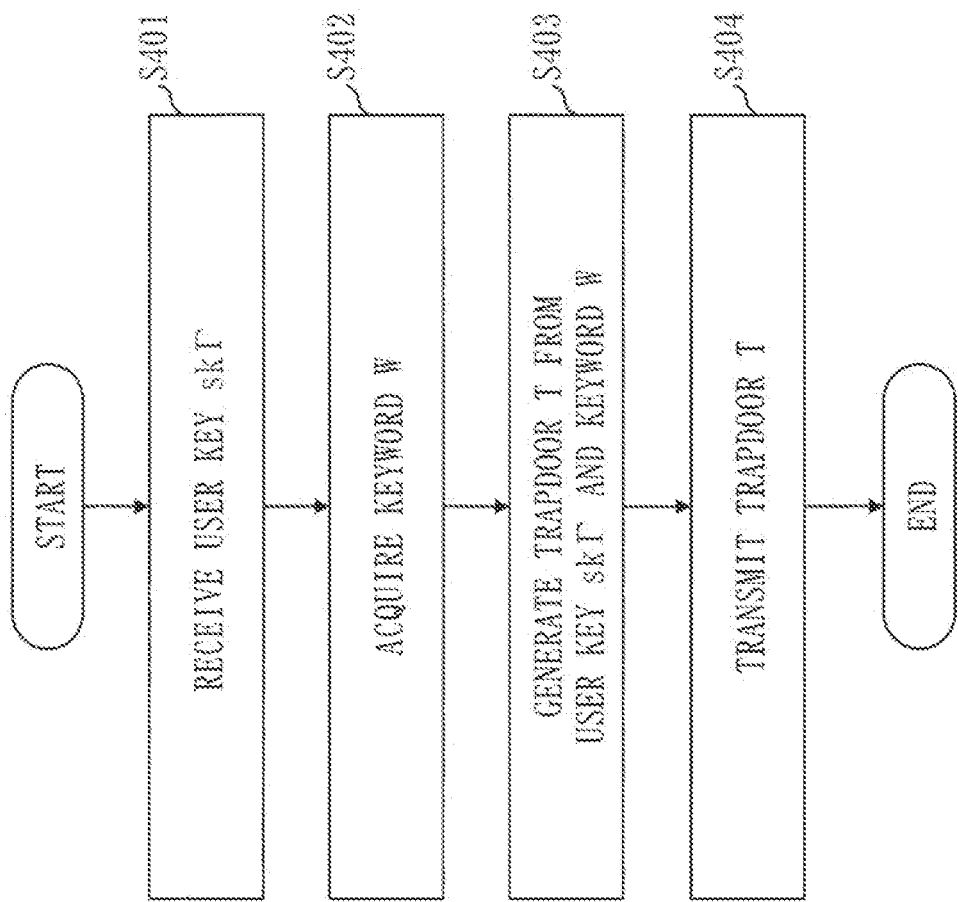
FIG. 10 is a flowchart illustrating a flow of processing of the trapdoor generation device according to Embodiment 1.

FIG. 10 illustrates an operational example of the trapdoor generation device 400 according to the present embodiment First, in step S401, the key reception unit 401 receives the user key sk$\Gamma$.

Next, in step S402, the keyword acquisition unit 402 acquires the keyword W.

Next, in step S403, the trapdoor generation unit 403 generates the trapdoor T.

Specially, the trapdoor generation unit 403 generates the trapdoor T in the following. r means a random number value in the following. The random number value generation unit 405 generates the random number value.

$$T0=H(K,W)+r$$

For $(i=1,\ldots,n)$, $$Ti1=H(ski,w),\ Ti2=H(Ti1,r)$$

$$T=(\Gamma,T0,(T11,T12),\ldots,(Tn1,Tn2))$$

Lastly, in step 404, the transmission unit 404 transmits the trapdoor T to the consistency determination device 600.

Figure 11:
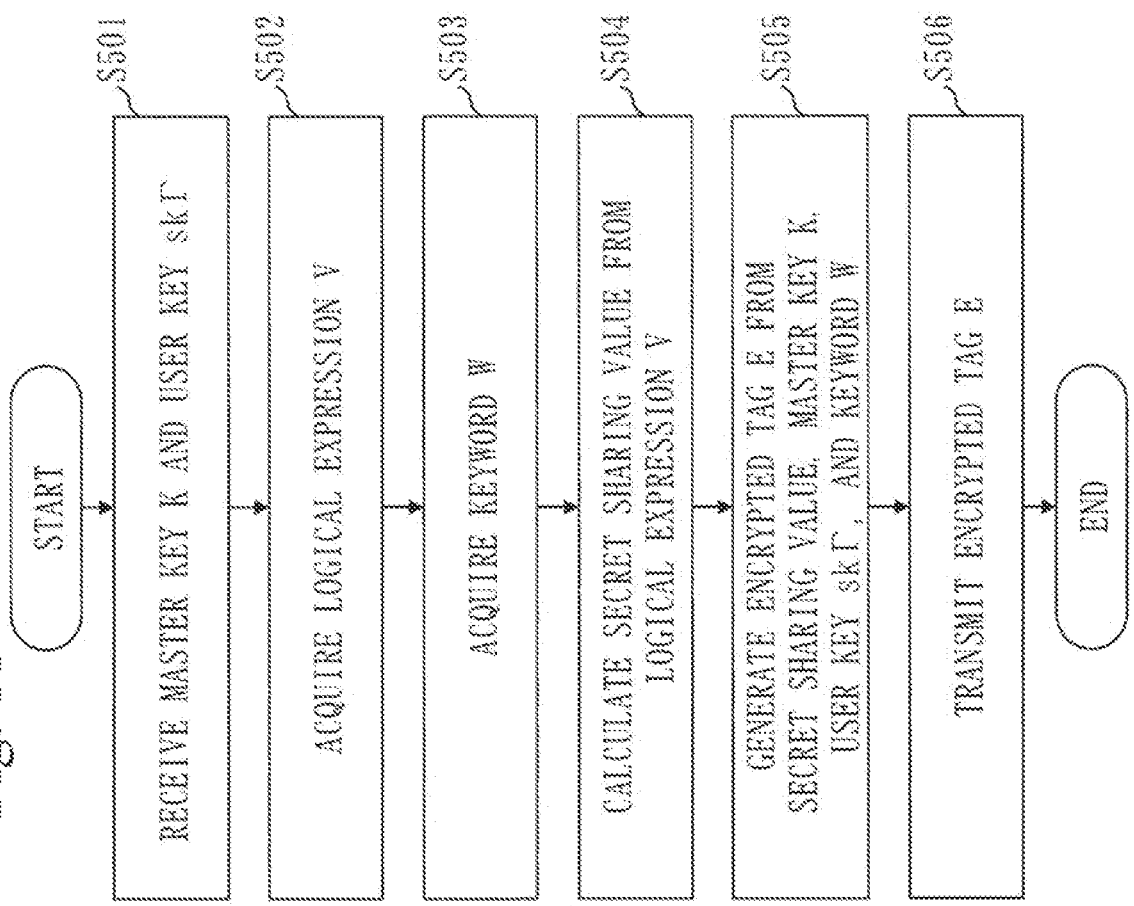
FIG. 11 is a flowchart illustrating a flow of processing of the encrypted tag generation apparatus according to Embodiment 1.

FIG. 11 illustrates an operational example of the encrypted tag generation apparatus 500 according to the present embodiment.

First, in step S501, the key reception unit 501 receives the master key K and the user key sk$\Gamma$.

Next, in step S502, the logical expression acquisition unit 502 acquires the logical expression V that represents the searchable condition L.

Next, in step S503, the keyword acquisition unit 503 acquires the keyword W.

Next, in step S504, the encrypted tag generation unit 504 calculates a secret sharing value from the logical expression V.

Details of step S504 will be described below.

Next, in step S505, the encrypted tag generation unit 504 generates the encrypted tag E from the secret sharing value generated in step S504, the master key K, the user key skΓ, and the keyword W.

Details of step S505 will be described below.

Lastly, in step S506, the transmission unit 505 transmits the encrypted tag E to the consistency determination device 600.

Figure 12:
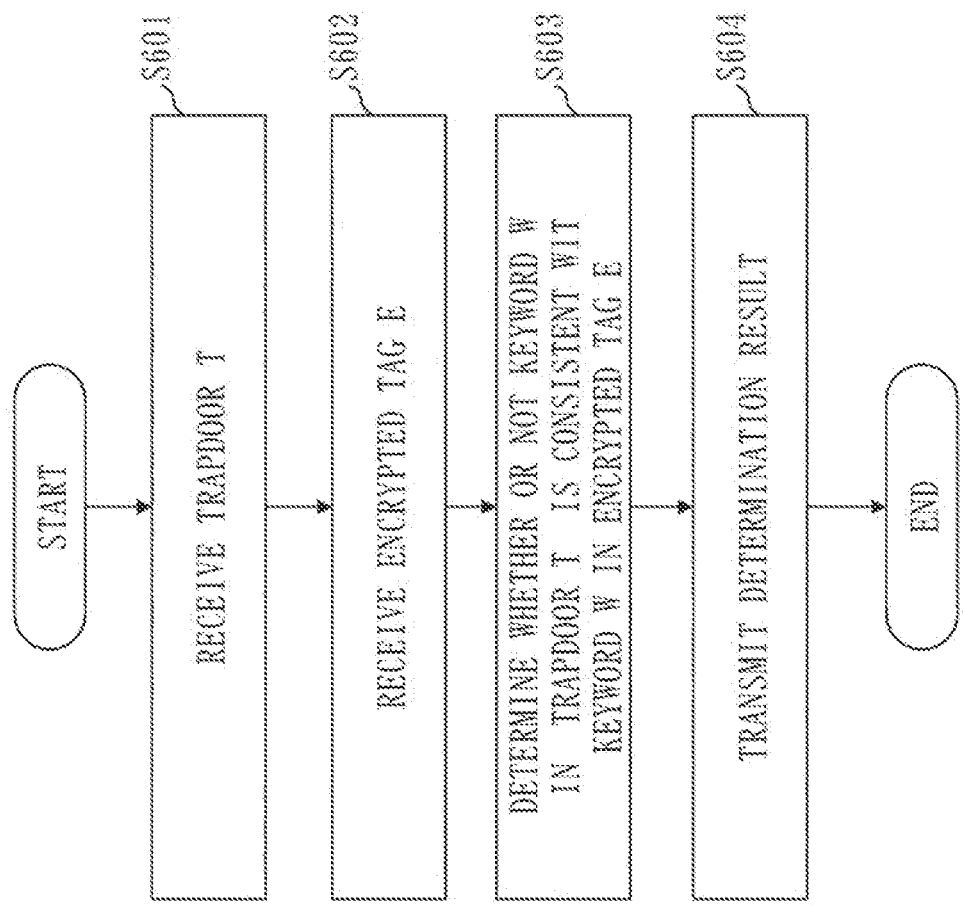
FIG. 12 is a flowchart illustrating a flow of processing of the consistency determination device according to Embodiment 1.

FIG. 12 illustrates an operational example of the consistency determination device 600 according to the present embodiment.

First, in step S601, the trapdoor reception unit 602 receives the trapdoor T.

Next, in step 602, the encrypted tag reception unit 601 receives the encrypted tag E.

The order of steps S601 and S602 may be interchanged. Alternatively, steps S601 and S602 may be performed in parallel.

Next, in step 603, the consistency determination unit 603 performs the consistency determination.

Details of step S603 will be described below.

Lastly, in step S604, the result transmission unit 604 transmits the determination result to the trapdoor generation device 400.

As described above, for example, when the consistency determination unit 603 determines that the keyword W included in the encrypted tag E is consistent with the keyword W included in the trapdoor T, the result transmission unit 604 transmits "0" as the determination result. On the other hand, when inconsistency is determined, the result transmission unit 604 transmits "1" as the determination result.

Next, the details of step S504 in FIG. 11 will be described.

In step S504, the encrypted tag generation unit 504 sets to each of a plurality of attribute values, a secret sharing value which reflects the logical structure represented by the logical expression V. Here, "setting the secret sharing value to each of the plurality of attribute values" means relating the secret sharing value to each attribute value.

Further, details of "the secret sharing value which reflects the logical structure" will be described below.

The logical expression V includes a plurality of attribute values and a logical operator.

The logical operator is the logical sum operator (OR) or the logical product operator (AND). In the following, the logical sum operator (OR) is referred to as a logical sum (OR) or OR, and the logical product operator (AND) is referred to as a logical product (AND) or AND.

When the logical expression V includes the logical sum (OR), the encrypted tag generation unit 504 sets to each of two or more logical sum attribute values which are two or more attribute values connected by the logical sum (OR), a secret sharing value which reflects that each of two or more logical sum attribute values is connected by the logical sum (OR). More specifically, the encrypted tag generation unit 504 sets to each of two or more logical sum attribute values, the holding random number value as a secret sharing value. The holding random number value is a random number value held by the random number value holding unit 507.

Further, when the logical expression V includes the logical product operator (AND), the encrypted tag generation unit 504 sets to each of two or more logical product attribute values which are two or more attribute values connected by the logical product operator (AND), a secret sharing value which reflects each of two or more logical product attribute values is connected by the logical product operator (AND). More specifically, the encrypted tag generation unit 504 causes the random number value generation unit 506 to generate a new random number value, and generate a further new random number value by performing calculation using the new random number value and the holding random number value. Then, the encrypted tag generation unit 504 sets to each of two or more logical product attribute values, either of the new random number value and the further new random number value, as a secret sharing value.

The details of step S504 of FIG. 11 will be described below using flowcharts.

Figure 13:
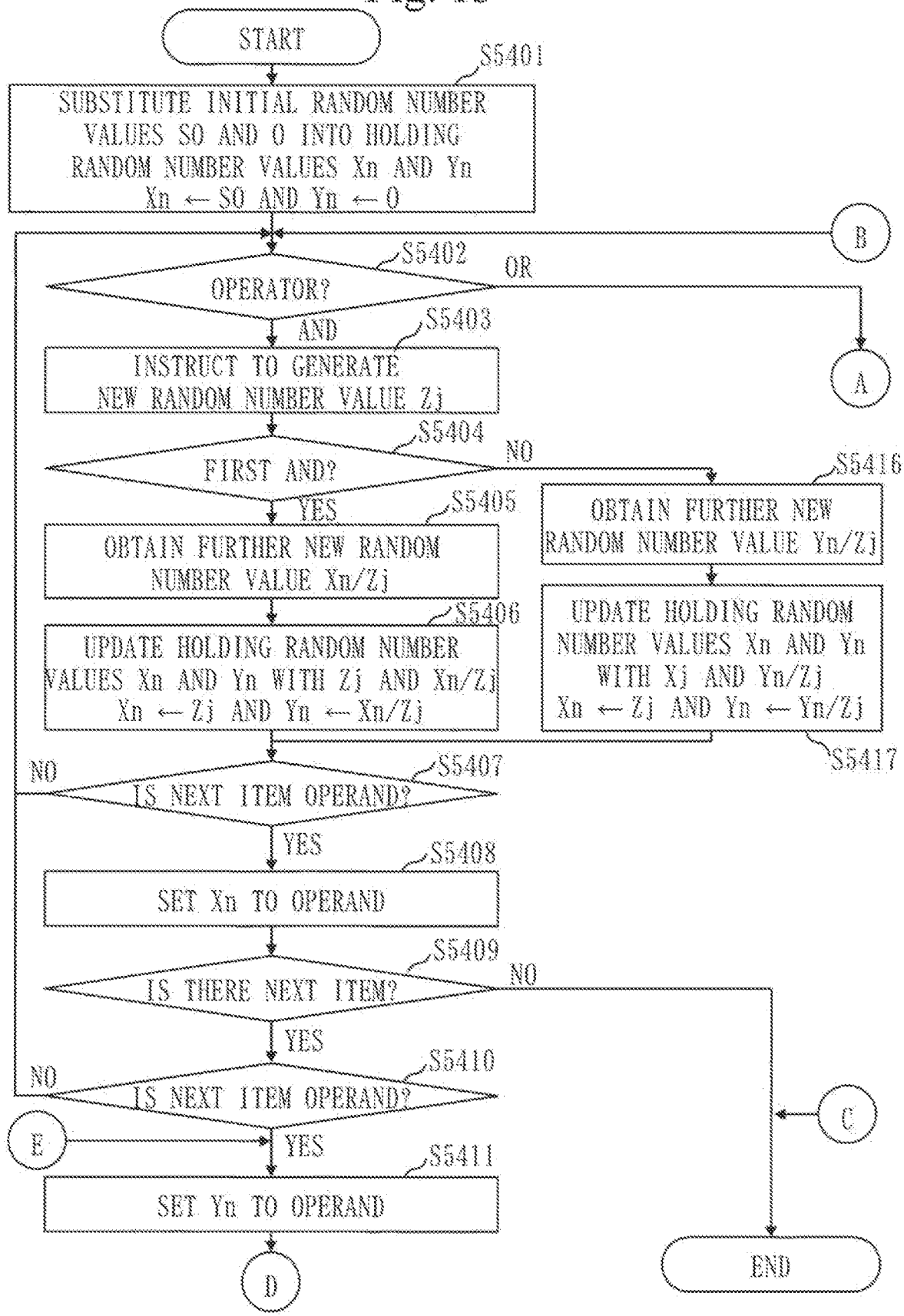
FIG. 13 is a flowchart illustrating details of processing of the encrypted tag generation apparatus according to Embodiment 1.
Figure 14:
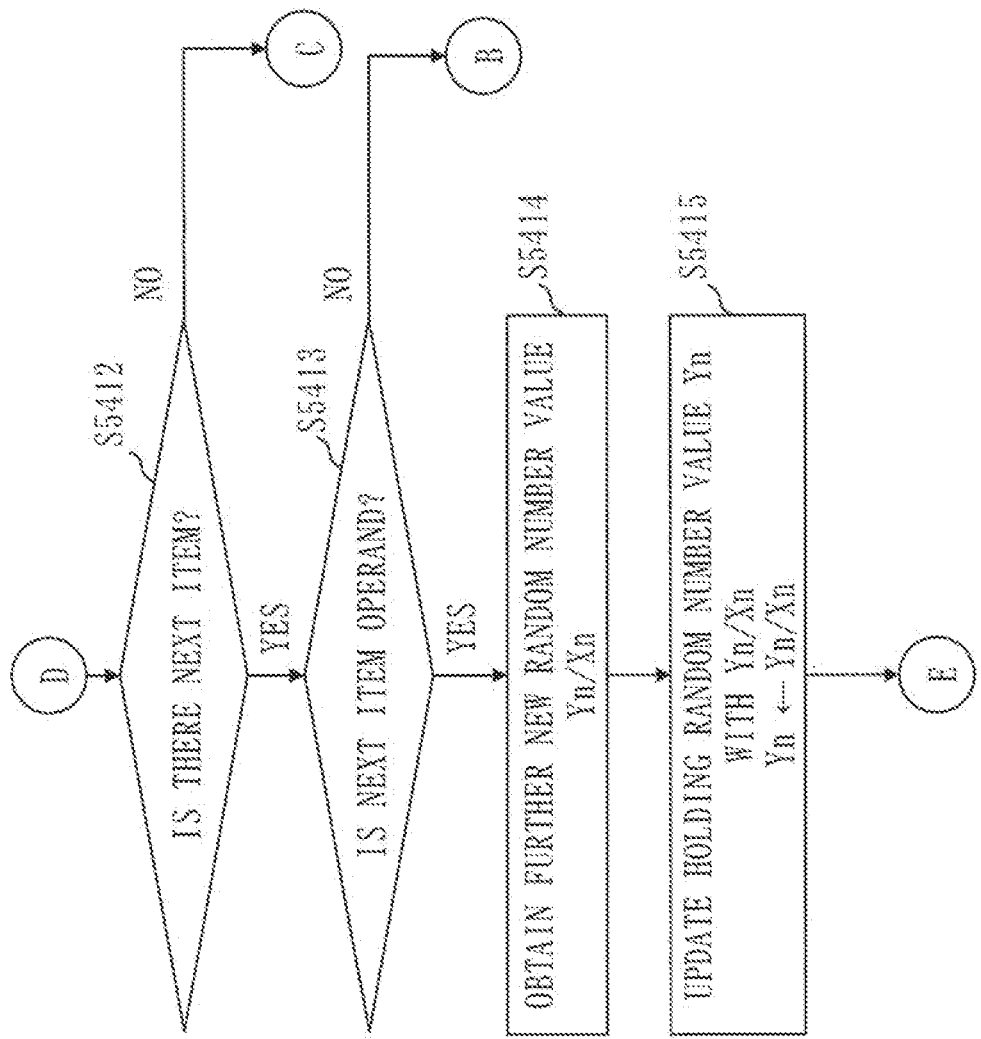
FIG. 14 is a flowchart illustrating details of processing of the encrypted tag generation apparatus according to Embodiment 1.
Figure 15:
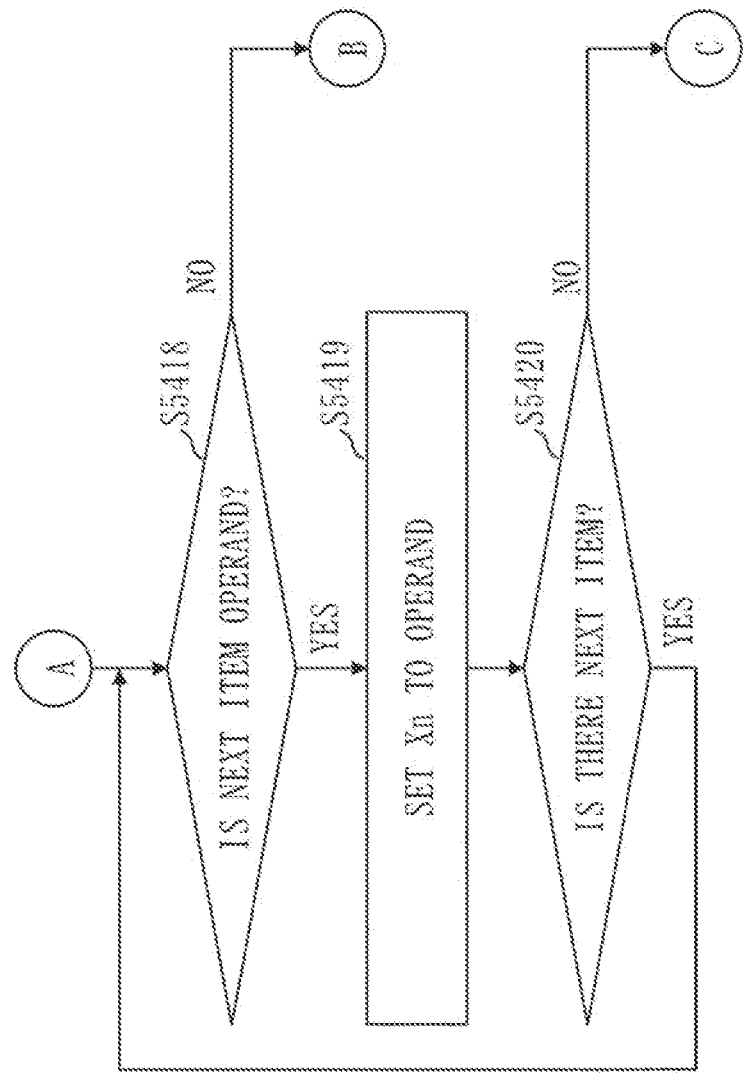
FIG. 15 is a flowchart illustrating details of processing of the encrypted tag generation apparatus according to Embodiment 1.

FIGS. 13, 14, and 15 are the flowcharts illustrating the details of step S504.

In the following, the random number value holding unit 507 holds holding random number values Xn and Yn. Note that n=1, 2, . . . .

Further, the encrypted tag generation unit 504 converts the logical expression V based on Polish notation, and scans the converted logical expression V from the top.

First, in step S5401, the encrypted tag generation unit 504 substitutes initial random number values S0 and 0 into the holding random number values Xn and Yn (Xn←S0 and Yn←0). That is, the encrypted tag generation unit 504 causes the random number value holding unit 507 to hold the initial random number values S0 and 0, as the holding random number values Xn and Yn.

The initial random number value is a random number value initially generated by the random number value generation unit 506.

Next, in step S5402, the encrypted tag generation unit 504 determines whether the logical operator included in the logical expression V is the logical product (AND) or the logical sum (OR).

When the first operator is the logical product (AND), processing proceeds to step S5403. On the other hand, when the first operator is the logical sum (OR), processing proceeds to step S5418 (FIG. 15).

In step S5403, the encrypted tag generation unit 504 causes the random number value generation unit 506 to generate a new random number value Zj. Here, j=1, 2, . . . .

Next, in step S5404, the encrypted tag generation unit 504 determines whether or not the logical product (AND) current concerned is the first AND.

When the logical product (AND) currently concerned is the first AND, processing proceeds to step S5405.

On the other hand, when the logical product (AND) currently concerned is not the first AND, processing proceeds to step S5416.

In step S5405, the encrypted tag generation unit 504 acquires the new random number value Zj from the random number value generation unit 506, and divides the current holding random number value Xn by the new random number value Zj to obtain a further new random number value (Xn/Zj).

Next, in step S5406, the encrypted tag generation unit 504 updates the current holding random number values Xn and Yn, with the new random number value Zj and the further new random number value (Xn/Zj) (Xn←Zj and Yn←(Xn/Zj)).

That is, the encrypted tag generation unit 504 causes the random number value holding unit 507 to hold the new random number value Zj and the further new random number value (Xn/Zj), as the updated holding random number values Xn and Yn.

Next, in step S5407, the encrypted tag generation unit 504 determines whether or not the item next to the logical product (AND) in the logical expression V is an operand (attribute value).

When the item next to the logical product (AND) is the operand (attribute value), processing proceeds to step S5408.

When the item next to the logical product (AND) is not the operand (attribute value), the next item is a logical operator. Therefore, processing returns to step S5402, and the encrypted tag generation unit 504 determines whether or not the logical operator is the logical product (AND) or the logical sum (OR).

In step S5408, the encrypted tag generation unit 504 sets the holding random number value Xn as a secret sharing value, to the operand (attribute value) which is the item next to the logical product (AND). The holding random number value Xn set here is the random number value updated in step S5406 or step S5417 to be described below.

Next, in step S5409, the encrypted tag generation unit 504 determines whether or not there is the next item in the logical expression V.

When there is the next item, processing proceeds to step S5410.

On the other hand, when there is no next item, processing ends.

In step S5410, the encrypted tag generation unit 504 determines whether or not the next item is an operand (attribute value).

When the next item is the operand (attribute value), processing proceeds to step S5411.

When the next item is not the operand (attribute value), the next item is a logical operator. Therefore, processing returns to step S5402, and the encrypted tag generation unit 504 determines whether the logical operator is the logical product (AND) or the logical sum (OR).

In step S5411, the encrypted tag generation unit 504 sets the holding random number value Yn as a secret sharing value, to the operand (attribute value) which is the next item. The holding random number value Yn set here is the random number value updated in step S5406 or step S5417 to be described below.

Next, in step S5412 of FIG. 14, the encrypted tag generation unit 504 determines whether or not there is the next item in the logical expression V.

When there is the next item, processing proceeds to step S5413.

On the other hand, when there is not next item, processing ends.

In step S5413, the encrypted tag generation unit 504 determines whether or not the next item is an operand (attribute value).

When the next item is the operand (attribute value), processing proceeds to step S5414.

When the next item is not the operand (attribute value), the next item is a logical operator. Therefore, processing returns to step S5402, the encrypted tag generation unit 504 determines whether or not the logical operator is the logical product (AND) or the logical sum (OR).

In step S5414, the encrypted tag generation unit 504 divides the current holding random number value Yn by the current holding random number value Xn to obtain a further new random number value (Yn/Xn). Note that (Yn/Xn) ={Xn−1/(Zj*Zj)}.

Next, in step S5415, the encrypted tag generation unit 504 updates the current holding random number value Yn with the further new random number value (Yn/Xn) (Yn←(Yn/Xn)).

Next, processing returns to step S5411, and the encrypted tag generation unit 504 sets the holding random number value Yn as a secret sharing value, to the operant (attribute value) which is the next item. The holding random number value Yn set here is the random number value updated in step S5415 (specifically (Yn/Xn)={Xn−1/(Zj*Zj)}).

After that, processing from step S5412 is performed.

When the logical product (AND) concerned in step S5404 is not the first AND (when AND is the second AND or after the second AND), in step S5416, the encrypted tag generation unit 504 obtains from the random number value generation unit 506, the new random number value Zj, and divides a current holding random number value Yn by the new random number value Zj to obtain a further new random number value (Yn/Zj).

Next, in step S5417, the encrypted tag generation unit 504 updates the current holding random number values Xn and Yn with the new random number value Zj and the further new random number value (Yn/Zj) (Xn←Zj and Yn←(Yn/Zj)).

That is, the encrypted tag generation unit 504 causes the random number value holding unit 507 to hold the new random number value Zj and the further new random number value (Yn/Zj) as the updated holding random number values Xn and Yn.

After that, processing from step S5407 is performed.

In step S5402, when the operator included in the logical expression V is the logical sum (OR), in step S5418 of FIG. 15, the encrypted tag generation unit 504 determines whether or not the item next to the logical sum (OR) is an operand (attribute value).

When the item next to the logical sum (OR) is the operand (attribute value), processing proceeds to step S5419.

When the item next to the logical sum (OR) is not the operand (attribute value), the next item is a logical operator. Therefore, processing returns to step S5402, and the encrypted tag generation unit 504 determines whether or not the logical operator is the logical product (AND) or the logical sum (OR).

In step S5419, the encrypted tag generation unit 504 sets the random holding number value as a secret sharing value, to the operand (attribute value) which is the next item.

Next, in step S5420, the encrypted tag generation unit 504 determines whether or not there is the next item in the logical expression V.

When there is the next item, processing returns to step S5418.

On the other hand, when there is no next item, processing ends.

By performing the procedures in FIGS. 13, 14, and 15, the encrypted tag generation unit 504 can set a secret sharing value to an operand (attribute value) included in the logical expression V.

Here, the procedures illustrated in FIGS. 13, 14, and 15 will be described using a specific example.

In the following, for example, the description will be given using a logical expression "(A OR B) AND (C AND D)". If this logical expression is converted according to the Polish notation, it is "AND OR A B AND C D". Each of two "ANDs" and "OR" is a logical operator, and each of "A", "B", "C", and "D" is an operand (attribute value).

According to step S5401, the encrypted tag generation unit 504 substitutes the initial random number values S0 and 0 into the holding random number values X1 and Y1 (X1←S0 and Y1←0).

The encrypted tag generation unit 504 scans the logical expression "AND OR A B AND C D" from the left. Since the first logical operator is "AND" ("AND" in step S5402), processing proceeds to step S5403.

In step S5403, the encrypted tag generation unit 504 instructs the random number value generation unit 506 to generate the new random number value Zj.

Here, it is assumed that Z1 is generated as the new random number value Zj.

Further, since the "AND" currently concerned is the first AND ("YES" in step S5404), processing proceeds to step S5405.

In step S5405, the encrypted tag generation unit 504 obtains the new random number value Z1 from the random number value generation unit 506, and divides the current holding random number value X1 by the new random number value Z1 to obtain a further new holding random number value (X1/Z1) (=(S0/Z1)).

Next, in step S5406, the encrypted tag generation unit 504 updates the current holding random number values X1 and Y1 with the new random number value Z1 and the further new random number value (X1/Z1) (X2←Z1 and Y2←(X1/Z1) (=(S0/Z1)).

Next, in step S5407, the encrypted tag generation unit 504 determines whether or not the item next to "AND" is an operand (attribute value).

In the logical expression "AND OR A B AND C D", the item next to "AND" is "OR". Therefore, processing returns to step S5402.

Further, as a result of determination of step S5402, processing proceeds to step S5418 of FIG. 15.

In step S5418, it is determined whether or not the item next to "OR" is an operand (attribute value).

In the logical expression "AND OR A B AND C D", the item next to "OR" is "A". Therefore, processing proceeds to step S5419.

In step S5419, the encrypted tag generation unit 504 sets the holding random number value X2 (=Z1) as a secret sharing value, to the operand (attribute value "A") which is the next item.

Next, in step S5420, the encrypted tag generation unit 504 determines whether or not there is the next item In the logical expression "AND OR A B AND C D", there is "B" next to "A". Therefore, processing proceeds to step S5418.

Then, since "B" which is the next item is an operand (attribute value), processing proceeds to step S5419.

As a result, in step S5419, the encrypted tag generation unit 504 sets the holding random number value X2 (=Z1) as a secret sharing value, to the operand (attribute value B") which is the next item.

Next, in step S5420, the encrypted tag generation unit 504 determines whether or not there is the next item.

In the logical expression "AND OR A B AND C D", there is "AND" next to "B". Therefore, processing proceeds to step S5418.

Then, since "AND" which is the next item is a logical operator, processing proceeds to step S5402 of FIG. 13.

Since the logical operator is "AND" ("AND" in step S5402), processing proceeds to step S5403.

In step S5403, the encrypted tag generation unit 504 instructs the random number value generation unit 506 to generate the new random number value Zj.

Here, it is assumed that Z2 is generated as the new random number value Zj.

Next, the "AND" currently concerned is the second AND ("NO" in step S5404). Therefore, processing proceeds to step S5416.

In step S5416, the encrypted tag generation unit 504 obtains the new random number value Z2 from the random number value generation unit 506, and divides the current holding random number value Y2 by the new random number value Z2 to obtain a further new random number value (Y2/Z2) (={S0/(Z1*Z2)}).

Next, in step S5417, the encrypted tag generation unit 504 updates the current holding random number values X2 and Y2 with the new random number value Z2 and the further new random number value (Y2/Z2) (X3←Z2 and Y3←(Y2/Z2)).

Next, in step S5407, the encrypted tag generation unit 504 determines whether or not the item next to "AND" is an operand (attribute value).

In the logical expression "AND OR A B AND C D", the item next to "AND" is "C". Therefore, processing proceeds to step S5408.

In step S5408, the encrypted tag generation unit 504 sets the holding random number value X3 (=Z2) as a secret sharing value, to the operand (attribute value "C") which is the item next to "AND".

Next, in step S5409, the encrypted tag generation unit 504 determines whether or not there is the next item.

In the logical expression "AND OR A B AND C D", there is "D" next to "C". Therefore, processing proceeds to step S5410. Then, since "D" is an operand (attribute value), processing proceeds to step S5411.

In step S5411, the encrypted tag generation unit 504 sets the holding random number value Y3 (=(Y2/Z2)) as a secret sharing value, for the attribute value "D".

Next, in step S5412 of FIG. 14, the encrypted tag generation unit 504 determines whether or not there is the next item.

In the logical expression "AND OR A B AND C D", "D" is the last item. Therefore, processing ends.

By the above processing, the secret sharing values X2=Z1, X=Z1, X3=Z2, and (Y2/Z2) (={S0/(Z1*Z2)}) are set to "A", "B", "C", and "D", respectively.

To "A" and "B" connected by the logical sum (OR), the common secret sharing value "Z1" is set. Therefore, it can be identified that both are connected by the logical sum (OR).

Further, as described above, in the present embodiment, in the case of the logical expression "A AND B", the basic principle is to set the secret sharing value s1 that satisfies s=s1+s2 to the attribute value A, and the secret sharing value s2 to the attribute value B. According to this basic principle, the encrypted tag generation unit 504 sets the secret sharing value "Z1" to "A" and "B", sets the secret sharing value "Z2" to "C", and sets the secret sharing value {S0/(Z1*Z2)} obtained by computation using "Z1" and "Z2" to "D". Therefore, it can be identified that "A", "B", "C" and "D" are connected by the logical product (AND).

Next, the details of step S505 of FIG. 11 will be described.

After processing of step S504 is performed, a secret sharing value is set to all operands.

In the following, it is assumed that m pieces of secret sharing values (S1, . . . , Sm) are set.

In step S505, the encrypted tag generation unit 504 calculates the following.

$$E0 = H(K, W) + S0$$

For $(i=1, \ldots, m)$, $$Ei1=H(H(ski,W),Ri)+Si \text{ and } Ei2=Ri$$

$$E=(L,E0,(E11,E12), \ldots ,(Em1,Em2))$$

Note that S0 is an initial random number value. Further, L is a searchable condition. Ri is a random number value.

Next, the details of step S603 of FIG. 12 will be described.

First, the consistency determination unit 603 compares the searchable condition L with the attribute value set Γ.

Then, the consistency determination unit 603 extracts the minimum attribute that satisfies the searchable condition L, from among the attribute Qi included in elements of the attribute value set Γ. Here, it is assumed that the consistency determination unit 603 extracts the minimum attribute that satisfies the searchable condition L, as (QQ1, . . . , QQu).

For example, when the logical expression "A OR B" is given as the searchable condition L, the searchable condition L is satisfied with QQ1=A and QQ2=B, or even QQ1=A only.

The consistency determination unit 603 extracts from among combinations of attributes that satisfy the searchable condition L such as above, a combination of attributes in which the number of attributes is the smallest, as "the minimum attribute that satisfies the searchable condition L".

Further, here, F is assumed to be a calculation formula for extracting the minimum attribute that satisfies the searchable condition L. The consistency determination unit 603 executes the calculation formula F to extract the minimum attribute (QQ1, . . . , QQu) that satisfies the searchable condition L.

Then, the consistency determination unit 603 extracts according to the following calculations, components of the encrypted tag E and components of the trapdoor T corresponding to the minimum attribute (QQ1, . . . , QQu) that satisfies the searchable condition L, as follows.

$$E0=H(K,W)+S0$$

For $i=1, \ldots ,u,$ $$Ei1=H(H(ski,W),Ri)+Si \text{ and } Ei2=Ri$$

$$T0=H(K,W)+r$$

For $i=1, \ldots ,u,$ $$Ti1=H(ski,W) \text{ and } Ti2=H(Ti1,r)$$

Note that each of Ri and r is a random number value.

Next, the consistency determination unit 603 calculates the secret sharing value Si by the following calculation.

For $i=1, \ldots , u,$ $$Si=Ei1+H(Ti1,Ei2)$$

Then, the consistency determination unit 603 calculates S0 that satisfies a condition, from the calculated secret sharing value Si, using the calculation formula F.

Specifically, the consistency determination unit 603 performs calculation as follows.

$$r=H(E0+S0)+T0$$

The above "condition" is, for example, the logical product (multiplication) of two attribute values in the case of the logical expression "A AND B". In the case of this example, the encrypted tag generation unit 504 is supposed to have set the secret sharing value Z1 to "A" and the secret sharing value (S0/Z1) to "B". Therefore, when the consistency determination unit 603 executes the calculation formula F (multiplication in the case of this example), the initial random number value S0 is restored.

Regarding the relation between the calculation formula F and the condition, if the operand in the logical expression is "OR", the calculation formula F is addition, and if the operand in the logical expression is "AND", the calculation formula F is multiplication.

Next, the consistency determination unit 603 determines whether or not Ti2=H(Ti1,r) is satisfied for (i=1, . . . , n).

If Ti2=H(Ti1,r) is satisfied for all of (i=1, . . . , n), the consistency determination unit 603 determines that the keywords W are consistent. On the other hand, if even one of (i=1, . . . , n) does not satisfy Ti2=H (Ti1,r), the consistency determination unit 603 determines that the keywords W are not consistent.

Description of Effects of Embodiment

As described above, in the searchable encryption system according to the present embodiment, there is no need to set a constraint on the length of a logical expression (that is, the number of attribute values included in the logical expression) used for generation of an encrypted tag. Therefore, it is possible to realize searchable encryption that enables more flexible access control.

Only a part of the procedures described in the present embodiment may be implemented.

Alternatively, at least a part of the procedures described in the present embodiment and a procedure not described in the present embodiment may be implemented in combination.

Alternatively, the configurations and procedures described in the present embodiment may be modified as necessary.

Description of Hardware Configuration

Lastly, a hardware configuration example of the master key generation device 200, the user key generation device 300, the trapdoor generation device 400, the encrypted tag generation apparatus 500, and the consistency determination device 600 will be described.

Figure 16:
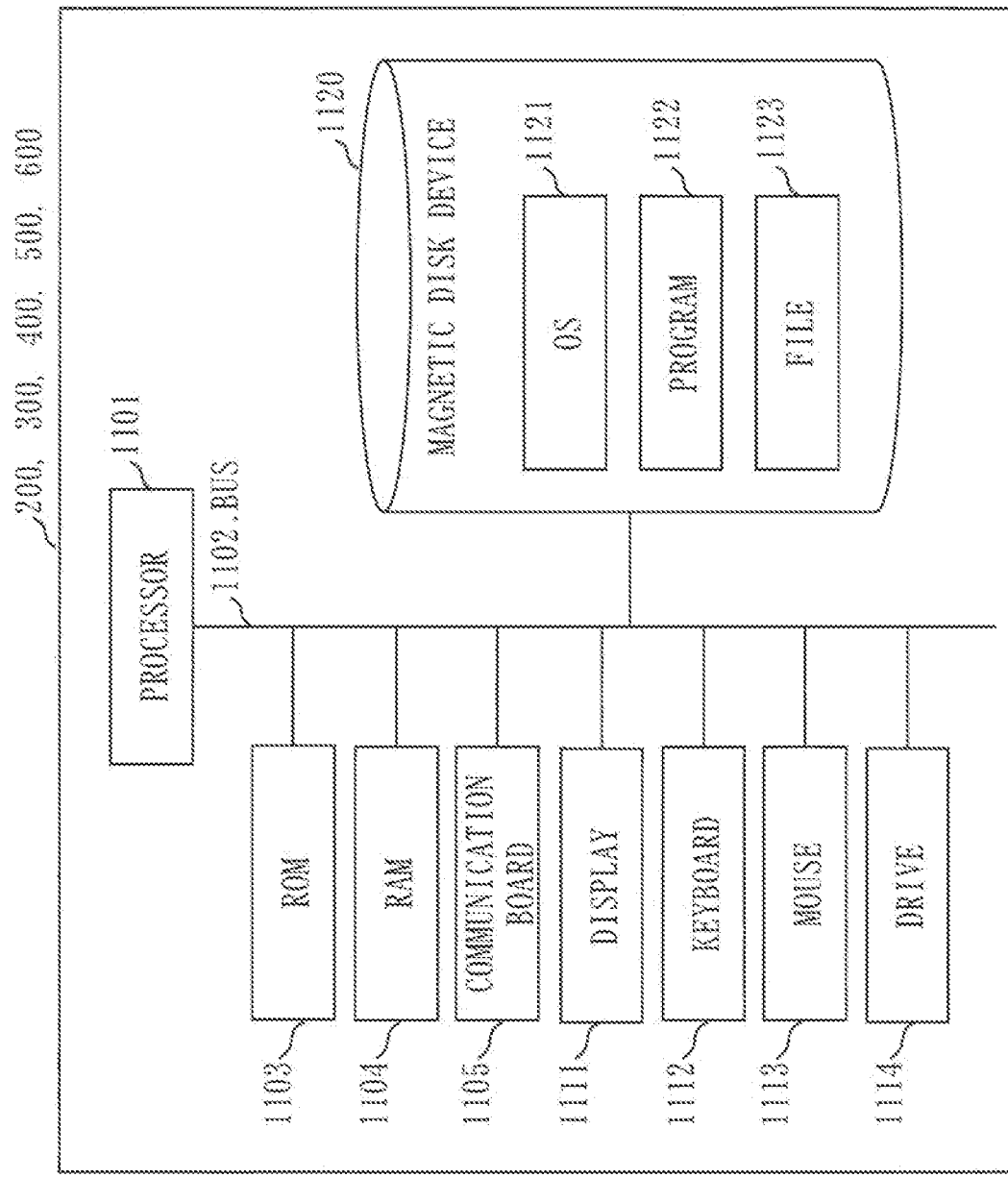
FIG. 16 is a diagram illustrating an example of hardware resources of the searchable encryption system according to Embodiment 1.

FIG. 16 illustrates the hardware configuration example of the master key generation device 200, the user key generation device 300, the trapdoor generation device 400, the encrypted tag generation apparatus 500, and the consistency determination device 600.

In FIG. 16, each of the master key generation device 200, the user key generation device 300, the trapdoor generation device 400, the encrypted tag generation apparatus 500, and the consistency determination device 600 includes a processor 1101.

The processor 1101 is, for example, a Central Processing Unit (CPU).

The processor 1101 is connected to a plurality of hardware devices via a bus 1102. The processor 1101 is connected to, for example, a Read Only Memory (ROM) 1103 and a Random Access Memory (RAM) 1104. Further, the processor 1101 may be connected to a communication board 1105, a display 1111 (display device), a keyboard 1112, and a mouse 1113. Further, the processor 1101 may be connected to a drive 1114 and a magnetic disk device 1120.

The processor 1101 controls these hardware devices.

The drive 1114 is a device that reads and writes a storage medium such as a Flexible Disk Drive (FD), a Compact Disc (CD), or a Digital Versatile Disc (DVD).

The ROM 1103, the RAM 1104, the magnetic disk device 1120, and the drive 1114 are examples of a storage device.

The keyboard 1112, the mouse 1113, and the communication board 1105 are examples of an input device.

The display 1111 and the communication board 1105 are examples of an output device.

The communication board 1105 is wired or wirelessly connected to a communication network such as a Local Area Network (LAN), the Internet, or a telephone line.

The magnetic disk device 1120 stores an Operating System (OA) 1121, a program 1122, and a file 1123.

The program 1122 includes a program that executes a function described as "unit" in the present embodiment. The program (for example, the encrypted tag generation program or the consistency determination program) is read and executed by the processor 1101. In other words, the program causes a computer to function as "unit", and causes the computer to execute a procedure and a method of "unit".

The file 1123 includes various data (input, output, determination result, calculation result, processing result, and the like) used in "unit" described in the present embodiment.

In the present embodiment, arrows included in the configuration diagrams and the flowcharts mainly indicate input/output of data or a signal.

The processing of the present embodiment described based on the flowcharts or the like, is executed using hardware such as the processor 1101, a storage device, an input device, or an output device.

An object described as "unit" in the present embodiment may be a "circuit", "device", or "equipment", and may be a "step", "procedure", "process", or "circuitry". In other words, the object described as "unit" may be implemented in firmware, software, hardware, or a combination of these.

Further, each of the master key generation device 200, the user key generation device 300, the trapdoor generation device 400, the encrypted tag generation apparatus 500, and the consistency determination device 600 may be implemented by a processing circuit.

The processing circuit is, for example, a logic Integrated Circuit (IC), a Gate Array (GA), an Application Specific Integrated Circuit (ASIC), or a Field-Programmable Gate Array (FPGA).

In this case, each of objects described as "unit" is implemented as a part of the processing circuit.

In the present description, a superordinate concept of the processor and the processing circuit is referred to as "processing circuitry".

That is, each of the processor and the processing circuit is a specific example of the "processing circuitry".

REFERENCE SIGNS LIST

100: searchable encryption system; 101: network; 200: master key generation device; 201: bit length acquisition unit; 202: key generation unit; 203: transmission unit; 204: random number value generation unit; 300: user key generation device; 301: key reception unit; 302: attribute value set acquisition unit; 303: user key generation unit; 304: transmission unit; 305: random number value generation unit; 400: trapdoor generation device; 401: key reception unit; 402: keyword acquisition unit; 403: trapdoor generation unit; 404: transmission unit; 405: random number value generation unit; 500: encrypted tag generation apparatus; 501: key reception unit; 502: logical expression acquisition unit; 503: keyword acquisition unit; 504: encrypted tag generation unit; 505: transmission unit; 506: random number value generation unit; 507: random number value holding unit; 600: consistency determination device; 601: encrypted tag reception unit; 602: trapdoor reception unit; 603: consistency determination unit; 604: result transmission unit; 605: random number value generation unit; 1101: processor; 1102: bus; 1103: ROM; 1104: RAM; 1105: communication board; 1111: display; 1112: keyboard; 1113: mouse; 1114: drive; 1120: magnetic disk device; 1121: OS; 1122: program; 1123: file.

The invention claimed is:

1. An encrypted tag generation apparatus comprising:
processing circuitry:
to acquire a logical expression that represents a condition under which searchable encryption is permitted, by a logical structure with a plurality of attribute values and at least one of a logical sum operator and a logical product operator;
to generate a random number value;
to hold the random number value generated, as a holding random number value; and
to: when the logical expression includes the logical sum operator, set to each of two or more logical sum attribute values which are two or more attribute values connected by the logical sum operator, the holding random number value as a secret sharing value which reflects that each of the two or more logical sum attribute values is connected by the logical sum operator; when the logical expression includes the logical product operator, generate a new random number value, generate a further new random number value by performing calculation using the new random number value and the holding random number value, and set to each of two or more logical product attribute values which are two or more attribute values connected by the logical product operator, one of the new random number value and the further new random number value, as a secret sharing value which reflects that each of the two or more logical product attribute values is connected by the logical product operator; and generate an encrypted tag to be used for the searchable encryption, using a plurality of secret sharing values set to the plurality of attribute values.

2. The encrypted tag generation apparatus according to claim 1, wherein
when the new random number value is generated and the further new random number value is generated, the processing circuitry updates the holding random number value with at least one of the new random number value and the further new random number value.

3. The encrypted tag generation apparatus according to claim 1, wherein
the processing circuitry generates a plurality of encrypted tags, using a master key based on a common key scheme, a user key generated from the master key, a keyword for the searchable encryption, an initial random number value which is a random number value initially generated, and the plurality of secret sharing values.

4. A searchable encryption system comprising:
an encrypted tag generation apparatus described in claim 3;
a trapdoor generation device to generate a plurality of trapdoors, using a common random number value which is a random number value common to the plurality of trapdoors, and the master key based on a common key scheme, the user key generated from the master key, and a keyword for searchable encryption; and a consistency determination device to acquire a plurality of encrypted tags generated by the encrypted tag generation apparatus described in claim 3 and the plurality of trapdoors, to calculate a plurality of secret sharing values which reflects a logical structure of a logical expression that represents a condition under which the searchable encryption is permitted, using the plurality of encrypted tags and the plurality of trapdoors, to restore an initial random number value which is a random number value initially generated by the encrypted tag generation apparatus described in claim 3, using the calculated plurality of secret sharing values, to calculate the common random number value, using the restored initial random number value, and to determine whether or not the keyword used for generation of the plurality of encrypted tags is consistent with the keyword used for generation of the plurality of trapdoors, using the calculated common random number value.

5. An encrypted tag generation method comprising:

acquiring a logical expression that represents a condition under which searchable encryption is permitted, by a logical structure with a plurality of attribute values and at least one of a logical sum operator and a logical product operator;

generating a random number value;

holding the random number value generated, as a holding random number value;

when the logical expression includes the logical sum operator, setting to each of two or more logical sum attribute values which are two or more attribute values connected by the logical sum operator, the holding random number value as a secret sharing value which reflects that each of the two or more logical sum attribute values is connected by the logical sum operator;

when the logical expression includes the logical product operator, generating a new random number value, generating a further new random number value by performing calculation using the new random number value and the holding random number value, and setting to each of two or more logical product attribute values which are two or more attribute values connected by the logical product operator, one of the new random number value and the further new random number value, as a secret sharing value which reflects that each of the two or more logical product attribute values is connected by the logical product operator; and generating an encrypted tag to be used for the searchable encryption, using a plurality of secret sharing values set to the plurality of attribute values.

6. A non-transitory computer readable medium storing an encrypted tag generation program causing a computer to execute:

a logical expression acquisition process to acquire a logical expression that represents a condition under which searchable encryption is permitted, by a logical structure with a plurality of attribute values and at least one of a logical sum operator and a logical product operator;

a random number value generation process to generate a random number value;

a random number value holding process to hold the random number value generated by the random number value generation process, as a holding random number value; and an encrypted tag generation process to: when the logical expression includes the logical sum operator, set to each of two or more logical sum attribute values which are two or more attribute values connected by the logical sum operator, the holding random number value as a secret sharing value which reflects that each of the two or more logical sum attribute values is connected by the logical sum operator; when the logical expression includes the logical product operator, generate a new random number value by the random number value generation process, generate a further new random number value by performing calculation using the new random number value and the holding random number value, and set to each of two or more logical product attribute values which are two or more attribute values connected by the logical product operator, one of the new random number value and the further new random number value, as a secret sharing value which reflects that each of the two or more logical product attribute values is connected by the logical product operator; and generate an encrypted tag to be used for the searchable encryption, using a plurality of secret sharing values set to the plurality of attribute values.

* * * * *